(12) United States Patent
Webb, III

(10) Patent No.: US 8,750,335 B2
(45) Date of Patent: Jun. 10, 2014

(54) METHOD, SYSTEM AND COMPUTER PROGRAM PRODUCT FOR MEASURING A COMMUNICATION FROM A FIRST DEVICE TO A SECOND DEVICE

(75) Inventor: Charles Albert Webb, III, Austin, TX (US)

(73) Assignee: Anue Systems, Inc., Austin, TX (US)

( * ) Notice: Subject to any disclaimer, the term of this patent is extended or adjusted under 35 U.S.C. 154(b) by 240 days.

(21) Appl. No.: 13/505,508

(22) PCT Filed: Nov. 18, 2010

(86) PCT No.: PCT/US2010/057306
§ 371 (c)(1),
(2), (4) Date: May 2, 2012

(87) PCT Pub. No.: WO2011/063167
PCT Pub. Date: May 26, 2011

(65) Prior Publication Data
US 2012/0221881 A1 Aug. 30, 2012

Related U.S. Application Data

(60) Provisional application No. 61/263,263, filed on Nov. 20, 2009.

(51) Int. Cl.
*H04L 12/28* (2006.01)
*H04J 3/06* (2006.01)
*H04L 12/26* (2006.01)
*H04L 12/56* (2006.01)

(52) U.S. Cl.
CPC ............ *H04L 43/0852* (2013.01); *H04L 47/10* (2013.01)

USPC ......... 370/516; 370/252; 370/328; 455/452.1

(58) Field of Classification Search
CPC ....... H04L 47/10; H04L 47/14; H04L 43/106; H04L 43/0852; H04L 47/35; H04L 27/14; H04W 24/02
USPC ............. 370/252–516; 455/402.2, 452.1, 456
See application file for complete search history.

(56) References Cited

U.S. PATENT DOCUMENTS

| 4,712,060 A | 12/1987 | Bailey et al. ................ 324/83 R |
| 5,025,457 A * | 6/1991 | Ahmed ......................... 375/354 |

(Continued)

OTHER PUBLICATIONS

International Application No. PCT/US2010/057306 (International filing date Nov. 18, 2010), "International Preliminary Report and Opinion" dated May 22, 2012, 7 pgs.

(Continued)

*Primary Examiner* — Afsar M Qureshi
(74) *Attorney, Agent, or Firm* — Egan, Peterman & Enders LLP.

(57) ABSTRACT

In response to communications from a first device to a second device, respective phase differences are estimated between a first clock of the first device and a second clock of the second device. A first average phase difference is computed within a percentile of a first subset of the respective phase differences. The percentile is less than 100. A second average phase difference is computed within the percentile of a second subset of the respective phase differences. The second subset is a modification of the first subset. The second average phase difference is computed in response to the first average phase difference and the modification.

30 Claims, 21 Drawing Sheets

(56) References Cited

U.S. PATENT DOCUMENTS

| | | | |
|---|---|---|---|
| 6,340,910 B1* | 1/2002 | Saeki | 327/296 |
| 6,977,903 B1* | 12/2005 | Ohtani et al. | 370/252 |
| 7,864,813 B2* | 1/2011 | Lundqvist et al. | 370/503 |
| 7,924,887 B2* | 4/2011 | Sun et al. | 370/503 |
| 2004/0141457 A1* | 7/2004 | Seo et al. | 370/203 |
| 2008/0226004 A1* | 9/2008 | Oh | 375/358 |
| 2009/0059788 A1 | 3/2009 | Granovsky et al. | 370/235 |
| 2009/0140773 A1 | 6/2009 | Cheung | 327/3 |

OTHER PUBLICATIONS

Bregni, "Fast Algorithms for TVAR and MTIE Computation in Characterization of Network Synchronization Performance", Dept. of Electronics and Computer Science, 4 pgs. (2001).

International Application No. PCT/US2010/057306 (International filing date Nov. 18, 2010), "*International Search Report and Written Opinion,*" dated Jan. 18, 2011.

\* cited by examiner

METHOD, SYSTEM AND COMPUTER PROGRAM PRODUCT FOR MEASURING A COMMUNICATION FROM A FIRST DEVICE TO A SECOND DEVICE

RELATED APPLICATIONS

This Application claims priority to U.S. Provisional Patent Application Ser. No. 61/263,263, which was filed on Nov. 20, 2009, and is entitled "METHOD, SYSTEM AND COMPUTER PROGRAM PRODUCT FOR MEASURING A COMMUNICATION FROM A FIRST DEVICE TO A SECOND DEVICE." This Application is a national stage of PCT/2010/057306 filed Nov. 18, 2010, and published in English, claiming benefit of U.S. Provisional Patent Application Ser. No. 61/263,263, filed on Nov. 20, 2009.

BACKGROUND

The present disclosure relates in general to information handling systems, and in particular to a method, system and computer program product for measuring a communication from a first device to a second device. For example, conventional techniques are potentially inefficient for computation of time deviation and various other metrics.

SUMMARY

In response to communications from a first device to a second device, respective phase differences are estimated between a first clock of the first device and a second clock of the second device. A first average phase difference is computed within a percentile of a first subset of the respective phase differences. The percentile is less than 100. A second average phase difference is computed within the percentile of a second subset of the respective phase differences. The second subset is a modification of the first subset. The second average phase difference is computed in response to the first average phase difference and the modification.

DETAILED DESCRIPTION

Figure 1:
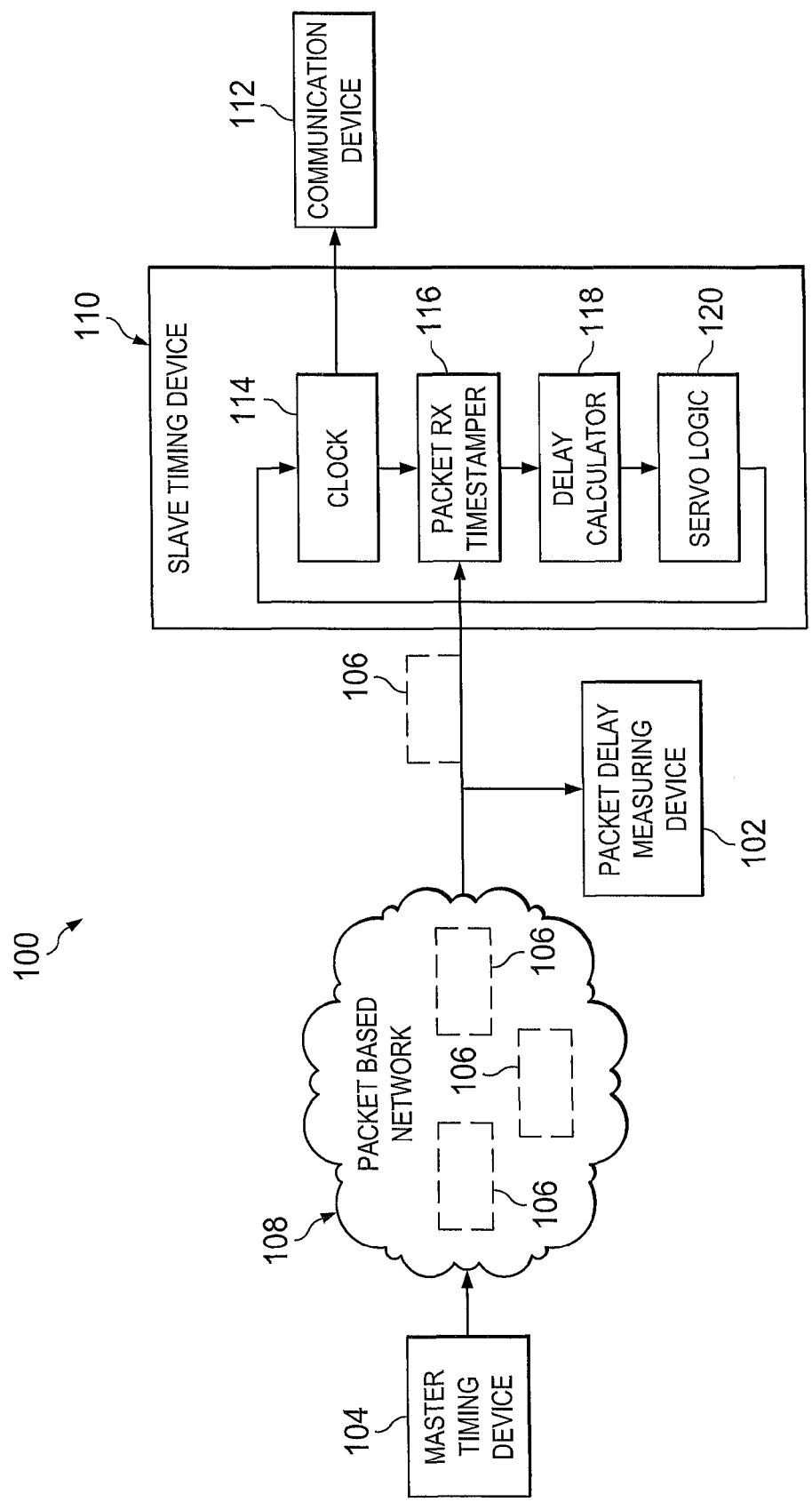
FIG. 1 is a block diagram of a system that includes a measuring device according to the illustrative embodiment.

FIG. 1 is a block diagram of a system, indicated generally at 100, that includes a packet delay measuring device 102 according to the illustrative embodiment. In the system 100, a master timing device 104 outputs a series of synchronization packets 106 (which operate as timing information) through a packet-based network 108 to a slave timing device 110. The slave timing device 110 receives the series of synchronization packets 106 from the master timing device 104 and, in response thereto, the slave timing device 110 synchronizes its time and/or frequency operations with the master timing device 104.

In this manner, the master timing device 104 operates as a synchronization source for other elements (e.g., the slave timing device 110) of the system 100. In one example, the slave timing device 110 and the communication device 112 together form a cellular base station for communicating information between the network 108 and cellular wireless telephones (not shown in FIG. 1) in a synchronized manner. Synchronization is important for a variety of reasons (e.g., loss of synchronization can reduce quality of service, such as dropped calls and bit slips).

Accordingly, the slave timing device 110: (a) receives the packets 106 from the network 108; and (b) in response thereto, outputs timing signals to a communication device 112. The communication device 112 receives the timing signals from the slave timing device 110 and, in response thereto, the communication device 112 synchronizes its time and/or frequency operations with the master timing device 104. In this manner, the system 100 suitable for protocols that transfer time of day from one network element to another such as IEEE 1588 precision time protocol ("PTP"), and protocols that transfer traditional T1/E1 constant-bit-rate ("CBR") services via packetized networks, which is referred to as circuit emulation services ("CES"). In more examples, the system 100 is suitable for web-based electronic commerce, electronic mail, instant messaging, voice over internet protocol ("VoIP"), streaming video, and internet protocol television ("IPTV").

As shown in FIG. 1, the slave timing device 110 includes a clock 114, a packet received ("Pkt Rx") timestamper 116, a delay calculator 118, and servo logic 120. The clock 114: (a) estimates then-current time ("estimated time"); and (b) periodically outputs timing signals (encoding the estimated times) to the communication device 112 and to the timestamper 116.

The timestamper 116: (a) receives the timing signals from the clock 114; (b) receives the packets 106 from the network 108; (c) in response to the timing signals (from the clock 114) and the packets 106 (from the network 108), generates respective "received" timestamps for the packets 106; and (d) outputs the "received" timestamps and the packets 106 to the delay calculator 118. In association with the packets 106, the "received" timestamps include respective estimated times of the packets 106 receipt by the slave timing device 110 from the network 108.

In response to the "received" timestamps and the packets 106, the delay calculator 118 estimates delays between: (a) times when the master timing device 104 outputs the packets 106; and (b) times when the slave timing device 110 receives the packets 106. The delay calculator 118 outputs such estimated delays to the servo logic 120. In response to such estimated delays, the servo logic 120 automatically computes phase differences as time error ("TE") values and outputs suitable feedback signals to the clock 114. In response to such feedback signals from the servo logic 120, the clock 114 adjusts its timing signals (which the clock 114 outputs to the communication device 112 and to the timestamper 116) to increase their level of time and/or frequency synchronization with the master timing device 104.

Figure 2A:
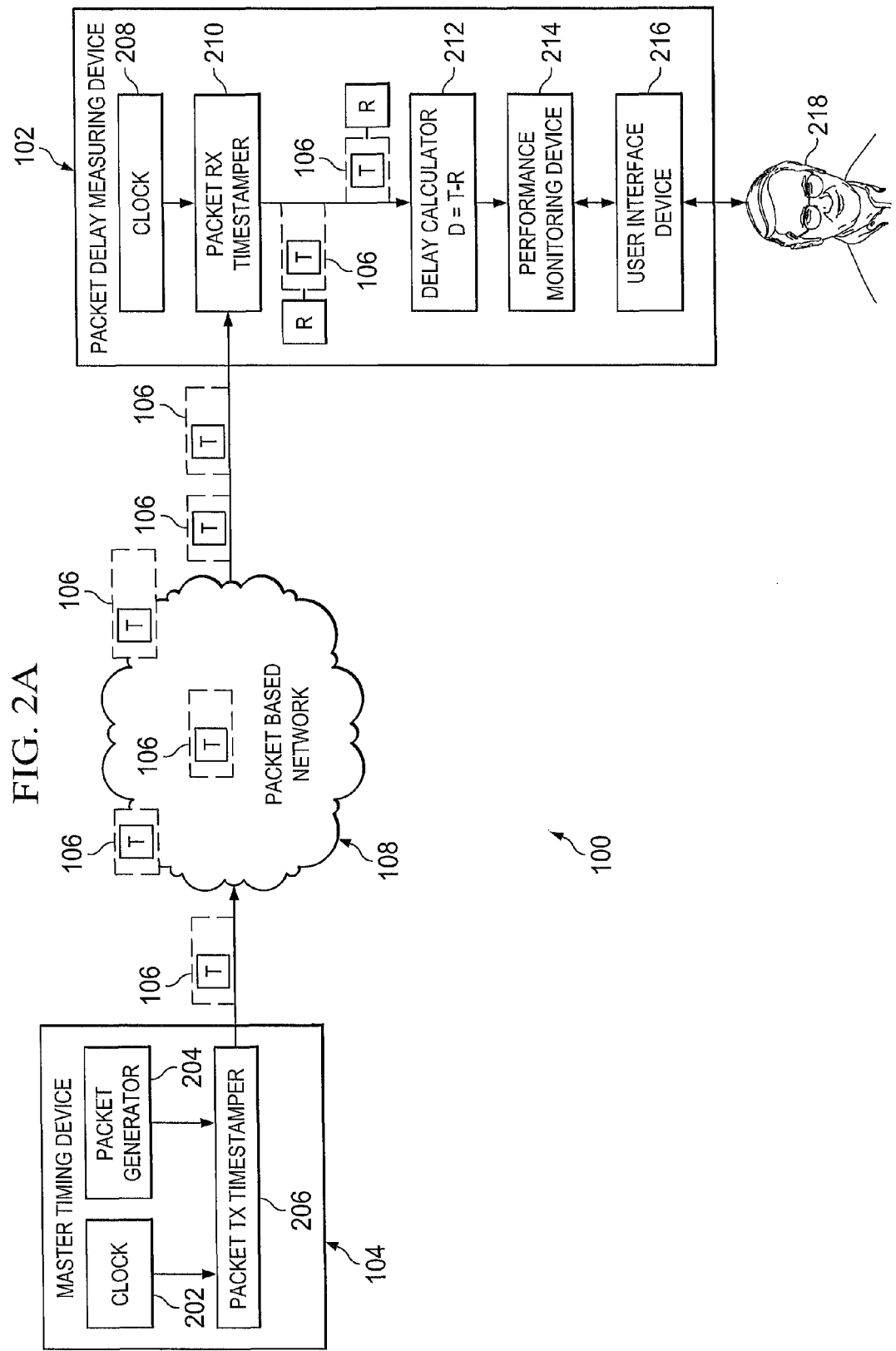
FIG. 2A is a block diagram of a first embodiment of the measuring device of the system of FIG. 1.

FIG. 2A is a block diagram of a first embodiment of the measuring device 102. In the example of FIG. 2A, in association with the packets 106, the master timing device 104 outputs respective "transmitted" timestamps to the network 108 (and, likewise, to the measuring device 102 and the slave timing device 110), according to a one-step PTP technique. In the one-step PTP technique, the master timing device 104 outputs a packet's associated "transmitted" timestamp within the packet itself.

In the example of FIG. 2A, the master timing device 104 includes a clock 202, a packet generator 204, and a packet transmitted ("Pkt Tx") timestamper 206. The clock 202 determines then-current time ("determined time"). The packet generator 204 generates and outputs the packets 106 to the timestamper 206. Also, the clock 202 periodically outputs timing signals (encoding the determined times) to the timestamper 206.

The timestamper 206: (a) receives the timing signals from the clock 202; (b) receives the packets 106 from the packet generator 204; and (c) in response to the timing signals (from the clock 202) and the packets 106 (from the packet generator 204), generates respective "transmitted" timestamps for the packets 106. In association with the packets 106, the "transmitted" timestamps include respective determined times of the packets 106 receipt by the timestamper 206 from the packet generator 204. The timestamper 206: (a) modifies the packets 106 by inserting (within the packets 106) their associated respective "transmitted" timestamps, and by updating (within the packets 106) their checksum values; and (b) outputs the packets 106 (as so modified) to the network 108.

In the example of FIG. 2A, the measuring device 102 includes a clock 208, a Pkt Rx timestamper 210, a delay calculator 212, a performance monitoring device 214, and a user interface device 216. The clock 208: (a) estimates then-current time ("estimated time"); and (b) periodically outputs timing signals (encoding the estimated times) to the timestamper 210. The timestamper 210: (a) receives the timing signals from the clock 208; (b) receives the packets 106 from the network 108; (c) in response to the timing signals (from the clock 208) and the packets 106 (from the network 108), generates respective "received" timestamps for the packets 106; and (d) outputs the "received" timestamps and the packets 106 to the delay calculator 212. In association with the packets 106, the "received" timestamps include respective estimated times of the packets 106 receipt by the measuring device 102 from the network 108.

In response to the "received" timestamps and the packets 106 (which include their associated respective "transmitted" timestamps), the delay calculator 212 estimates delays between: (a) times when the master timing device 104 outputs the packets 106; and (b) times when the measuring device 102 receives the packets 106. In the measuring device 102 of FIG. 2A, for a packet $P_n$, the delay calculator 212 estimates a respective delay $D_n$ as being $T_n-R_n$, where: (a) $T_n$ is a "transmitted" timestamp of the packet $P_n$; and (b) $R_n$ is a "received" timestamp of the packet $P_n$.

The delay calculator 212 outputs such estimated delays to the performance monitoring device 214. In one embodiment, the measuring device 102 and the master timing device 104: (a) receive timing information from the same timing source (e.g., global positioning system ("GPS") timing source); and (b) synchronize their respective clocks in response to such timing information, so that (i) their estimated times are relatively accurate (in comparison to one another, and in comparison to such timing source), and (ii) likewise, such estimated delays from the delay calculator 212 are relatively accurate.

In response to such estimated delays from the delay calculator 212, the performance monitoring device 214 automatically computes TE values. Also, in response to commands that the performance monitoring device 214 receives from a human user 218 via the user interface device 216, the performance monitoring device 214 outputs information (e.g., computed TE values, computed minTDEV, computed percentileTDEV and bandTDEV measurements, and other results of the measuring device 102 operations) for display to the human user 218 via the user interface device 216. For example, such display may occur via a display device (e.g., a conventional flat panel monitor) of the user interface device 216, or via a print device (e.g., a conventional electronic printer or plotter) of the user interface device 216.

Figure 2B:
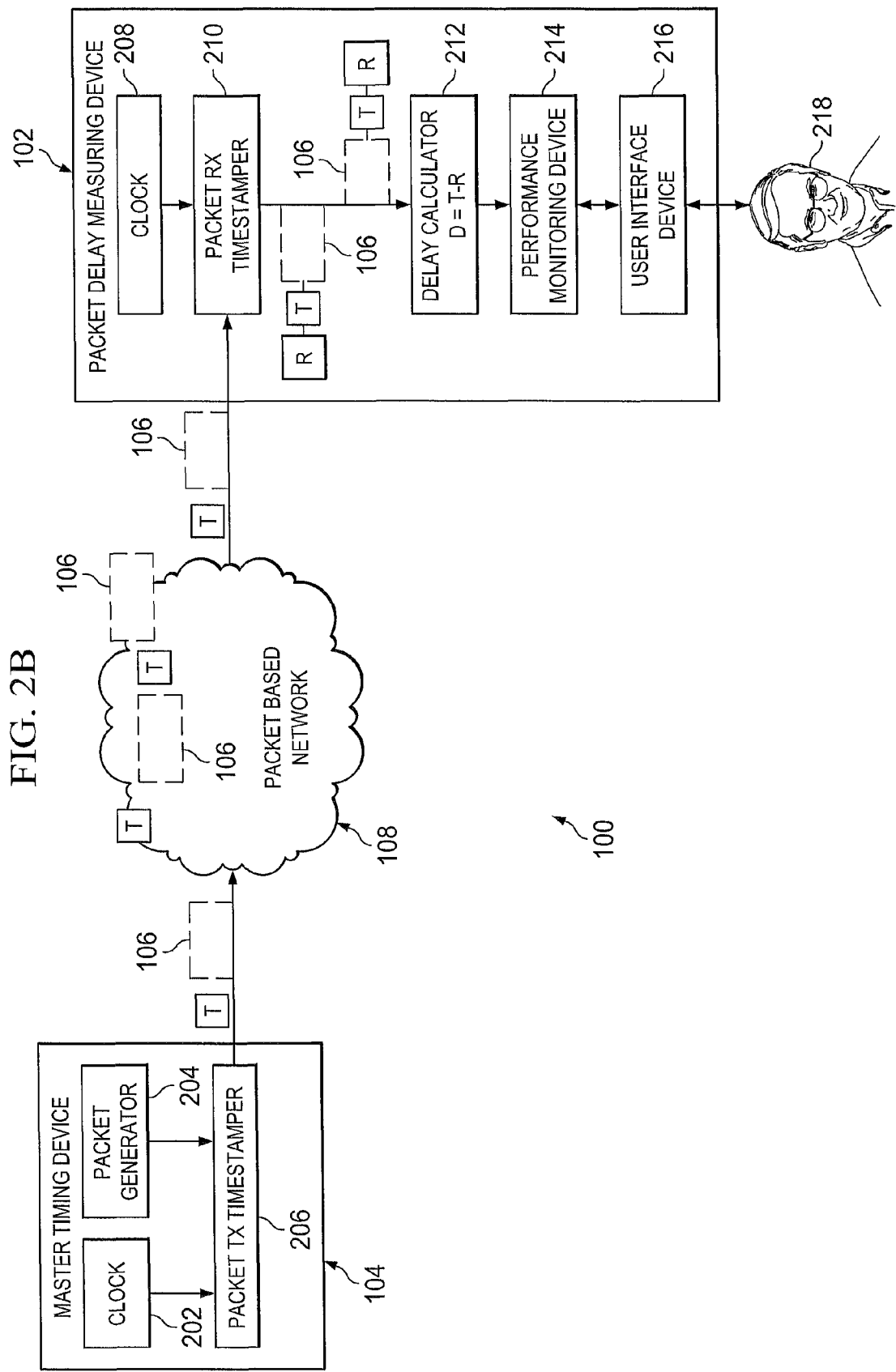
FIG. 2B is a block diagram of a second embodiment of the measuring device of the system of FIG. 1.

FIG. 2B is a block diagram of a second embodiment of the measuring device 102. In the example of FIG. 2B, in association with the packets 106, the timestamper 206 outputs respective "transmitted" timestamps to the network 108 (and, likewise, to the measuring device 102 and the slave timing device 110), according to a two-step PTP technique. In the two-step PTP technique, the timestamper 206 outputs a packet's associated "transmitted" timestamp after the timestamper 206 outputs the packet. Accordingly, the timestamper 206 of FIG. 2B is modified from the timestamper 206 of FIG. 2A, because the timestamper 206 of FIG. 2A modifies the packets 106 by inserting (within the packets 106) their associated respective "transmitted" timestamps.

In the example of FIG. 2B, the timestamper 210: (a) receives the timing signals from the clock 208; (b) receives the packets 106 and their associated respective "transmitted" timestamps from the network 108; (c) in response to the timing signals (from the clock 208) and the packets 106 (from the network 108), generates respective "received" timestamps for the packets 106; and (d) outputs the "received" timestamps, the packets 106 and their associated respective "transmitted" timestamps to the delay calculator 212. In the example of FIG. 2B, the timestamper 210 associates the packets 106 with their respective "transmitted" timestamps, according to sequence number and other protocol header fields of the packets 106 and such timestamps.

Figure 2C:
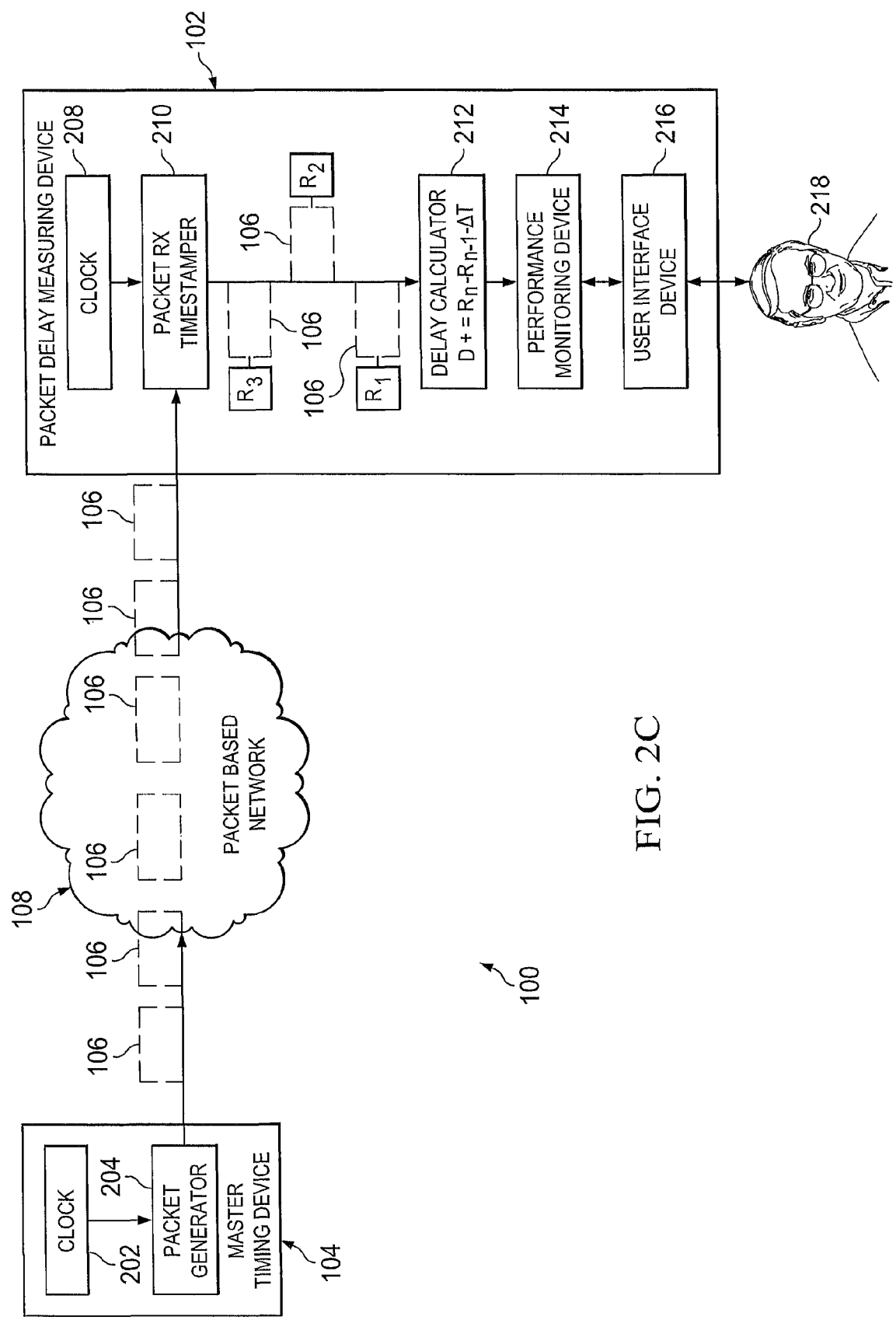
FIG. 2C is a block diagram of a third embodiment of the measuring device of the system of FIG. 1.

FIG. 2C is a block diagram of a third embodiment of the measuring device 102. In the example of FIG. 2C, the measuring device 102 and the slave timing device 110 associate respective timing information with the packets 106, according to a CES technique. In the CES technique, the time between packets (ΔT) is preprogrammed within the master timing device 104, the measuring device 102 and the slave timing device 110 (e.g., 1000 packets per second).

Accordingly, in the example of FIG. 2C, the timestamper 206 is removed from the master timing device 104. In such example, the packet generator 204: (a) receives the timing signals from the clock 202; and (b) in response to the timing signals (from the clock 202), generates and outputs the packets 106 to the network 108 at ΔT intervals, without "transmitted" timestamps. In the measuring device 102 of FIG. 2C, for a packet $P_n$, the delay calculator 212 estimates a respective delay variation D+ as being $R_n-R_{n-1}-\Delta T$, where: (a) $R_n$ is a "received" timestamp of the packet $P_n$; and (b) $R_{n-1}$ is a "received" timestamp of the packet $P_{n-1}$ (which directly precedes the packet $P_n$).

The delay calculator 212 outputs such estimated delay variations to the performance monitoring device 214. In response to such estimated delay variations, the performance monitoring device 214 automatically computes TE values. Also, in response to commands that the performance monitoring device 214 receives from the human user 218 via the user interface device 216, the performance monitoring device 214 outputs information (e.g., computed TE values, computed minTDEV, computed percentileTDEV and bandTDEV measurements, and other results of the measuring device 102 operations) for display to the human user 218 via the user interface device 216.

Figure 3A:
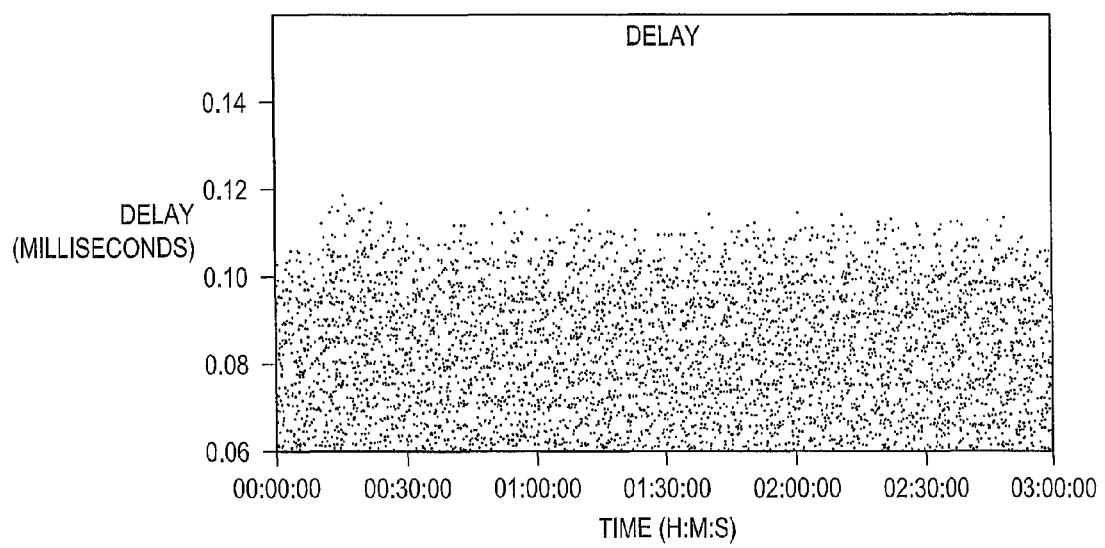
FIG. 3A is a scatter plot graph of packet delay as a function of time, in an example operation of the system of FIG. 1.

FIG. 3A is a scatter plot graph of packet delay as a function of time, in an example operation of the system 100. In the example of FIG. 3A, the network 108 is 30% loaded, and the master timing device 104 outputs the packets 106 to the network 108 at a rate of 1000 packets per second. As shown in FIG. 3A, the packets 106 experience variable delays between: (a) times when the master timing device 104 outputs the packets 106 to the network 108; and (b) times when the measuring device 102 receives the packets 106 from the network 108.

Figure 3B:
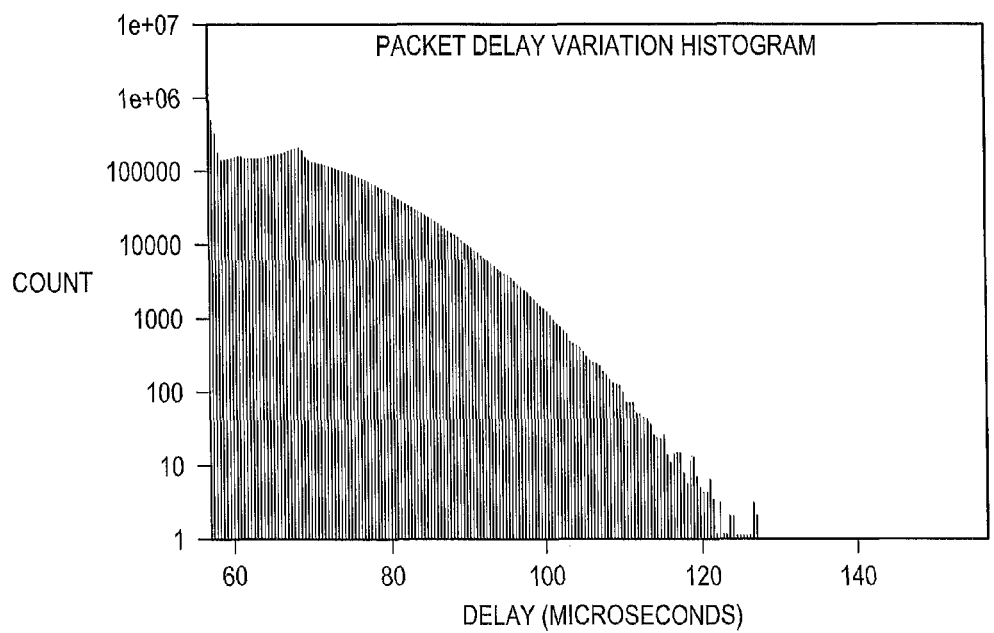
FIG. 3B is a histogram of the scatter plot graph of FIG. 3A.

FIG. 3B is a histogram of the scatter plot graph of FIG. 3A. In FIG. 3B, the horizontal axis shows a length of delay, and the vertical axis (which has a logarithmic scale) shows a number of the packets 106 that experienced such length of delay. In the example of FIG. 3B, 55 microseconds is the shortest length of delay.

In response to a set of consecutive data values ("window"), the performance monitoring device 214 computes sliding window statistics, such as sliding window average, sliding window median, sliding window minimum, and sliding window maximum. Sliding window statistics are useful in filtering and processing data. Accordingly, the performance monitoring device 214 repeatedly: (a) slides the window across the data to form a new set of consecutive data values; and (b) computes sliding window statistics in response to the new set of consecutive data values.

In the illustrative embodiment, the performance monitoring device 214 computes the sliding window statistics in response to delay data values (e.g., as shown in FIG. 3A) from the delay calculator 212, within a specified percentile and/or percentile range. Such percentile and/or percentile range is specified by the human user 218 via the user interface device 216. In the illustrative embodiment, the performance monitoring device 214 is applied to network synchronization.

In alternative embodiments, the performance monitoring device 214 is suitable for signal and image processing, financial analysis, and similar applications. For example, in signal and image processing, a sliding window average is useful in a finite impulse response ("FIR") low pass filter, with equal weights for each filter tap. In financial analysis, a sliding window average and trailing twelve month ("TTM") statistics are useful in determining relative value of financial instruments for buy/sell decisions.

In one example, the performance monitoring device 214 computes a sliding window average (e.g., dividing a sum of the window's data values by the number of such values), which can reduce an impact of high frequency noise that may exist in the set of data values. A sliding window summation is useful for computation (by the performance monitoring device 214) of time deviation ("TDEV") and various other metrics for measuring quality of network synchronization in a telecommunication system (e.g., system 100). By computing TDEV, the performance monitoring device 214 measures variation in packet delay.

In the computation of TDEV, the performance monitoring device 214 computes (as TE values) phase differences between the clock 202 (of the master timing device 104) and the clock 208 (of the packet delay measuring device 102), periodically at a suitable regular interval (e.g., at least once per second, with precision in the range of 10 nanoseconds or better). In response to a total number N of TE values ($x_1$ through $x_N$) computed by the performance monitoring device 214, the performance monitoring device 214 computes TDEV as a function of $\tau$, where $\tau$ is an observation interval that includes a subset n of consecutive TE values (within the total number N of TE values), according to the following equation:

$$TDEV(\tau) = \sqrt{\frac{1}{6n^2(N-3n+1)} \sum_{j=1}^{N-2n+1} \left[\sum_{i=j}^{n+j-1} x_{i+2n} - 2x_{i+n} + x_i\right]^2}$$

The TDEV equation has two nested summations, so its complexity grows in proportion to the square of the number of TE values. The innermost summation (which sums n values, starting at index i=j and ending at index i=n+j−1) may be computed as three consecutive sliding window summations, in the following manner:

$$\sum_{i=j}^{n+j-1} x_{i+2n} - 2x_{i+n} + x_i = \sum_{i=j}^{j+n-1} x_i - 2\sum_{i=j+n}^{j+2n-1} x_i + \sum_{i=f+2n}^{j+2n-1} x_i$$

However, the complexity of TDEV computation may be reduced from an order of $N^2$ operations to an order of N operations by replacing computation of the innermost summation (which sums n values, starting at index i=j and ending at index i=n+j−1) with a recursive computation (represented as $T_i(n)$) in the following manner:

$$TDEV(\tau) = \sqrt{\frac{1}{6n^2(N-3n+1)} \sum_{j=1}^{N-2n+1} T_j^2(n)}$$

where $$T_1(n) = \sum_{i=1}^{n} (x_{i+2n} - 2x_{i+n} + x_i)$$

and $$T_{j+1}(n) = T_j(n) + (x_{2n+j} - 3x_{2n+j} + 3x_{n+j} - x_i)$$

For a packet-based network (such as network 108), a conventional TDEV computation is difficult for measuring quality of network synchronization, because: (a) packets may experience queuing delay (in transmission via the network), which introduces packet delay variation ("PDV" or "jitter"); and (b) accurate computation of TE values is dependent upon observation of a sufficient quantity of packets. In some cases, a number of packets experience no queuing delay (in transmission via the network), so they achieve a "minimum" TE ("floor") and thereby communicate more accurate timing information. By comparison, a number of packets experience more queuing delay (in transmission via the network), so they achieve a higher TE and thereby communicate less accurate timing information. Accordingly, the clock 114 (of the slave timing device 110) achieves: (a) better timing performance in response to packets that have low TE values; and (b) worse timing performance in response to packets that have high TE values.

In one example, the performance monitoring device 214 computes the innermost summation (which sums n values, starting at index i=j and ending at index i=n+j−1) of the TDEV equation in response to only the minimum TE value (among such n values). Accordingly, in such example, the performance monitoring device 214 computes a modified version of TDEV ("minTDEV"), according to the following equation:

$$minTDEV(\tau) = \sqrt{\frac{1}{6}([x_{min(i+2n)} - 2x_{min(i+n)} + x_{min(i)}]^2)}$$

where $$x_{min(i)} = \min_{j=i \ldots i+n-1} x_i$$

Nevertheless, the minTDEV computation is more susceptible to noise.

In another example, the performance monitoring device 214 computes the innermost summation (which sums n values, starting at index i=j and ending at index i=n+j−1) of the TDEV equation in response to only the TE values within a specified percentile (among such n values). Such percentile is specified by the human user 218 via the user interface device 216. For example, if such percentile is 10, then the performance monitoring device 214 computes the innermost summation of the TDEV equation in response to only the lowest 10% of TE values (among such n values). In that manner, such version of the TDEV computation ("percentileTDEV") is less susceptible to noise (in comparison to the minTDEV computation), because such version is computed in response to more TE values.

In yet another example, the performance monitoring device 214 computes the innermost summation (which sums n values, starting at index i=j and ending at index i=n+j−1) of the TDEV equation in response to only the TE values within a specified percentile range (among such n values). Such percentile range is specified by the human user 218 via the user interface device 216. For example, if such percentile range is 10 through 90, then the performance monitoring device 214 computes the innermost summation of the TDEV equation in response to all of the TE values (among such n values) except: (a) the lowest 10% of such TE values; and (b) the highest 10% of such TE values. Accordingly, in such version of the TDEV computation ("bandTDEV"), the TE values within such percentile range may be identified by sorting the TE values in the following manner (where x'(i) is an array of sorted TE values):

$$x'(i) = \text{sort}\{x_i \ldots x_{i+n-1}\}$$

Accordingly, $x'_j(i)$ references the $j^{th}$ element of the sorted TE values. For example, $x'_n(i)$ is the minimum TE value (among such n values). Similarly, $x_{n-1}'(i)$ represents the maximum TE value (among such n values). Within such percentile range, a indexes the lowest TE value, and b indexes the highest TE value, in the following manner:

$$a = \text{floor}(n\,L)$$

$$b = \text{ceiling}(n\,U)$$

$$m = (b-a)+1$$

The average of the TE values within such percentile range is:

$$x'_{band\_mean}(i) = \frac{1}{m}\sum_{j=a}^{b} x'_{j+i}$$

In response to such average, the performance monitoring device 214 computes bandTDEV, according to the following equation:

$$bandTDEV(\tau) = \sqrt{\frac{1}{6}\langle [x'_{band\_mean}(i+2n) - 2x'_{band\_mean}(i+n) + x'_{band\_mean}(i)]^2 \rangle}$$

Accordingly, the performance monitoring device 214 computes $x'_{band\_mean}$ before computing bandTDEV. In many cases, bandTDEV is superior to percentileTDEV as a measurement of the system 100 performance. Moreover, the bandTDEV computation is adaptable to a variety of situations. For example, a bandTDEV(0% to 100%) computation's result is equal to a TDEV computation's result, a bandTDEV(0% to 10%) computation's result is equal to a percentileTDEV(10%) computation's result, and a bandTDEV(0% to 0%) computation's result is equal to a minTDEV computation's result.

The percentileTDEV and bandTDEV measurements are potentially inefficient to compute, especially if a large number n of TE values are sorted inefficiently to identify the TE values within the specified percentile and/or percentile range. Nevertheless, by computing $x'_{band\_mean}$ in a relatively efficient manner, the performance monitoring device 214 likewise computes percentileTDEV and bandTDEV in a relatively efficient manner.

For percentileTDEV and bandTDEV computations, the performance monitoring device 214 slides the τ window by: (a) removing the "last" or "oldest" TE value from the window; and (b) inserting the "next" or "newest" TE value within the τ window. After sliding the τ window, the performance monitoring device 214 performs a current $x'_{band\_mean}$ computation for the τ window, by suitably adding to (and/or subtracting from) a previous $x'_{band\_mean}$ computation's sum. For that purpose, the performance monitoring device 214 stores TE values: (a) according to percentile, in a balanced (or partially balanced) tree structure, such as a red-black tree structure; and (b) according to time order, in a circular buffer with a single pointer. Advantageously, the performance monitoring device 214 achieves sliding window percentileTDEV and bandTDEV computations in a relatively efficient manner with approximately O(N log(N)) complexity.

FIGS. 4A through 9E illustrate a version of the performance monitoring device 214 operation, which is discussed further hereinbelow in connection with the flowchart of FIGS. 11A and 11B. In the illustrative embodiment, the servo logic 120 (of the slave timing device 110 of FIG. 1) performs: (a) the same operations (e.g., including the same percentileTDEV and bandTDEV computations) as the performance monitoring device 214; (b) the same operations as the user interface device 216; and (c) other servo logic 120 operations. Accordingly, the delay calculator 118 outputs estimated delays to the servo logic 120. In response to such estimated delays (and in response to, and in accordance with, percentiles and other parameters specified by the human user 218 via the user interface device), the servo logic 120 automatically: (a) computes TE values; (b) computes percentileTDEV and bandTDEV in the same relatively efficient manner as the performance monitoring device 214; and (c) outputs suitable feedback signals to the clock 114. In response to such feedback signals from the servo logic 120, the clock 114 adjusts its timing signals (which the clock 114 outputs to the communication device 112 and to the timestamper 116) to increase their level of time and/or frequency synchronization with the master timing device 104.

Figure 4A:
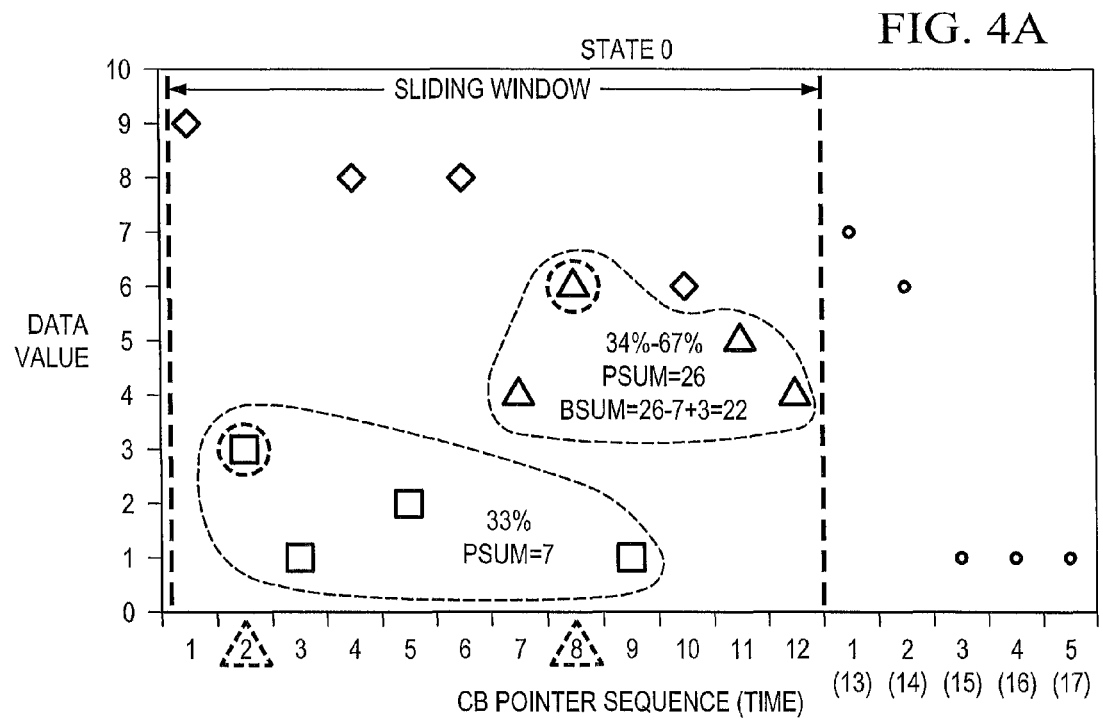
FIG. 4A is a graph of packet delay as a function of time, for packets communicated during a first time window in the example operation of the system of FIG. 1.

FIG. 4A is a graph of packet delay (or TE value) as a function of time, for packets communicated during a first time window in the example operation of the system 100. As shown in FIG. 4A: (a) the example data set includes seventeen (17) data points having respective TE values of 9, 3, 1, 8, 2, 8, 4, 6, 1, 6, 5, 4, 7, 6, 1, 1 and 1; (b) for clarity, the horizontal axis ("CB Pointer Sequence") represents time in units that equal the integer sequence numbers 1 through 17 of such data points; and (c) the performance monitoring device 214 performs a current $x'_{band\_mean}$ computation for a first τ window ("State 0") that includes the first n=12 of such data points.

In the example of FIG. 4A, the performance monitoring device 214 performs the $x'_{band\_mean}$ computation within a user-specified percentile range of 33 through 67. Accordingly, the lowest TE value within such percentile range is the fourth lowest TE value within the τ window, because: (a) the τ window has n=12 TE values; and (b) the percentile floor level is 33. Similarly, the highest TE value within such percentile range is the eighth lowest TE value within the τ window, because: (a) the τ window has n=12 TE values; and (b) the percentile ceiling level is 67.

In FIG. 4A, the four lowest TE values within the τ window are 1 (i.e., data point 3), 1 (i.e., data point 9), 2 (i.e., data point 5) and 3 (i.e., data point 2), which together form a lowest 33% of TE values within the τ window. Their sum is 7, which the performance monitoring device 214 adds to compute a "33% PSUM"=7, as shown in FIG. 4A. Within such 33%, the largest TE value (i.e., the $33^{rd}$ percentile value) is 3 (i.e., data point 2), which is circled with a dashed line in FIG. 4A, and whose corresponding data point 2 is marked with a dashed triangle in the horizontal axis of FIG. 4A.

Also, in FIG. 4A, the next four lowest TE values within the τ window are 4 (i.e., data point 7), 4 (i.e., data point 12), 5 (i.e., data point 11) and 6 (i.e., data point 8), which together form a next lowest 34% of TE values within the τ window. Their sum is 19, which the performance monitoring device 214 adds to the sum of the lowest 33% of TE values within the τ window to compute a "34%-67% PSUM"=7+19=26, as shown in FIG. 4A. Within such 34%, the largest TE value (i.e., the $67^{th}$ percentile value) is 6 (i.e., data point 8), which is circled with a dashed line in FIG. 4A, and whose corresponding data point 8 is marked with a dashed triangle in the horizontal axis of FIG. 4A.

Notably, in the example of FIG. 4A, data point 8 has a TE value=6, and data point 10 likewise has a TE value=6. Nevertheless, such next lowest 34% has space for only one of the data points 8 and 10. In that case, the performance monitoring device 214 breaks the tie by selecting the oldest of such data points (i.e., data point 8) for inclusion within such next lowest 34%. However, in alternative embodiments, the performance monitoring device 214 breaks such ties in other ways (e.g., based upon a data point's position within a circular buffer, or based upon a data point's memory address).

The performance monitoring device 214 computes a band sum ("BSUM") by subtracting the 33% PSUM from the 34%-67% PSUM, and by then adding the $33^{rd}$ percentile value (i.e., data point 2 whose TE value=3). Accordingly, the performance monitoring device 214 computes BSUM=26−7+3=22, as shown in FIG. 4A.

Figure 4B:
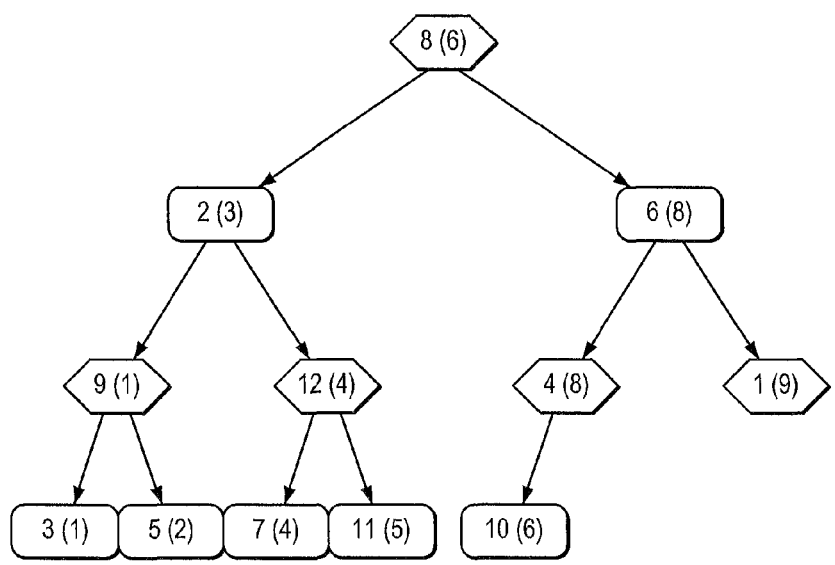
FIG. 4B is an illustration of a data structure formed by the measuring device of the system of FIG. 1, in response to the packets communicated during the first time window of FIG. 4A.

FIG. 4B is an illustration of a data structure formed by the measuring device 102, in response to the packets communicated during the first time window of FIG. 4A. In the illustrative embodiment, the data structure is a red-black tree. In the example of FIG. 4B, the tree is at least partially balanced. In other examples, the tree is fully balanced.

In FIG. 4B, the "red" nodes are four-sided (non-shaded), and the "black" nodes are six-sided (shaded). The performance monitoring device 214: (a) associates each node with a respective data point; (b) stores (at such node) the respective data point's position within a circular buffer (discussed further hereinbelow in connection with FIG. 4C); and (c) optionally stores (at such node) the respective data point's TE value, as shown in the example of FIG. 4B with TE values in parentheses.

In the illustrative embodiment, the tree accommodates situations in which: (a) multiple data points may have the same TE value; and (b) the performance monitoring device 214 may insert nodes associated with respective data points, irrespective of whether the TE values of such data points ascend or descend. As the performance monitoring device 214 slides the window, the performance monitoring device 214: (a) deletes (from the tree) a node associated with a respective data point that moves out of the τ window; (b) inserts (into the tree) a node associated with a respective data point that moves into the τ window; and (c) rearranges nodes (within the tree) to comply with conventional rules for a red-black tree data structure. By traversing the tree, the performance monitoring device 214 readily identifies a next highest TE value ("LUNEXT" operation) or a next lowest TE value ("LUPREV" operation) within the tree. The performance monitoring device 214 achieves the insert, delete, LUNEXT, LUPREV and other lookup operations in a relatively efficient manner with approximately O(log(N)) complexity.

Figure 4C:
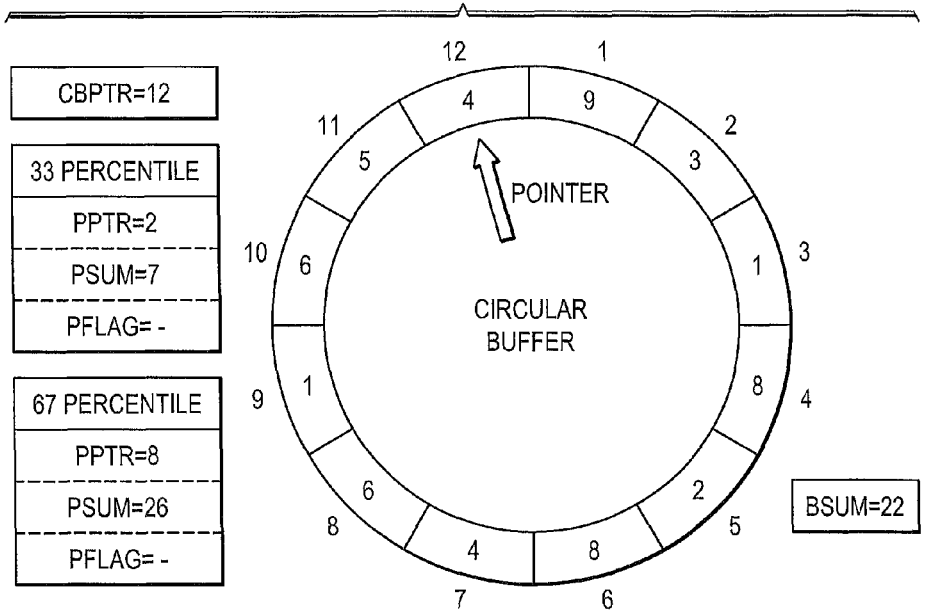
FIG. 4C is an illustration of a circular buffer formed by the measuring device of the system of FIG. 1, in response to the packets communicated during the first time window of FIG. 4A.

FIG. 4C is an illustration of a circular buffer formed by the measuring device 102, in response to the packets communicated during the first time window of FIG. 4A. As shown in FIG. 4C, the circular buffer's positions are numbered 1 to 12, and the performance monitoring device 214 maintains a circular buffer pointer ("CBPTR") that identifies a then-current last position within the circular buffer. In the example of FIG. 4C, the CBPTR identifies position number 12 as the then-current last position within the circular buffer. In the circular buffer, the performance monitoring device 214 stores the n=12 TE values for the τ window in chronological order. In the illustrative embodiment, the circular buffer is a contiguous range of memory locations, which is accessed by pointers. In an alternative embodiment, the circular buffer is a circularly linked list.

Also, as shown in FIG. 4C, the performance monitoring device 214 stores data pointers for computing the 33% PSUM ("33 Pctile PSUM"), the 34%-67% PSUM ("67 Pctile PSUM"), and the BSUM. For example, the performance monitoring device 214 stores: (a) the position of the $33^{rd}$ percentile value within the circular buffer ("33 Pctile PPTR"), which is position number 2 (TE value=3) within the circular buffer in the example of FIG. 4C; (b) the position of the $67^{th}$ percentile value within the circular buffer ("67 Pctile PPTR"), which is position number 8 (TE value=6) within the circular buffer in the example of FIG. 4C; and (c) the 33 Pctile PSUM, the 67 Pctile PSUM, and the BSUM.

For the $33^{rd}$ percentile, PFLAG is either 0, 1 or null. If the $33^{rd}$ percentile's PFLAG=0, then the most recently deleted TE value was excluded from the 33 Pctile PSUM computation. Conversely, if the $33^{rd}$ percentile's PFLAG=1, then the most recently deleted TE value was included within the 33 Pctile PSUM computation.

Similarly, for the $67^{th}$ percentile, PFLAG is either 0, 1 or null. If the $67^{th}$ percentile's PFLAG=0, then the most recently deleted TE value was excluded from the 67 Pctile PSUM computation. Conversely, if the $67^{th}$ percentile's PFLAG=1, then the most recently deleted TE value was included within the 67 Pctile PSUM computation.

Figure 5A:
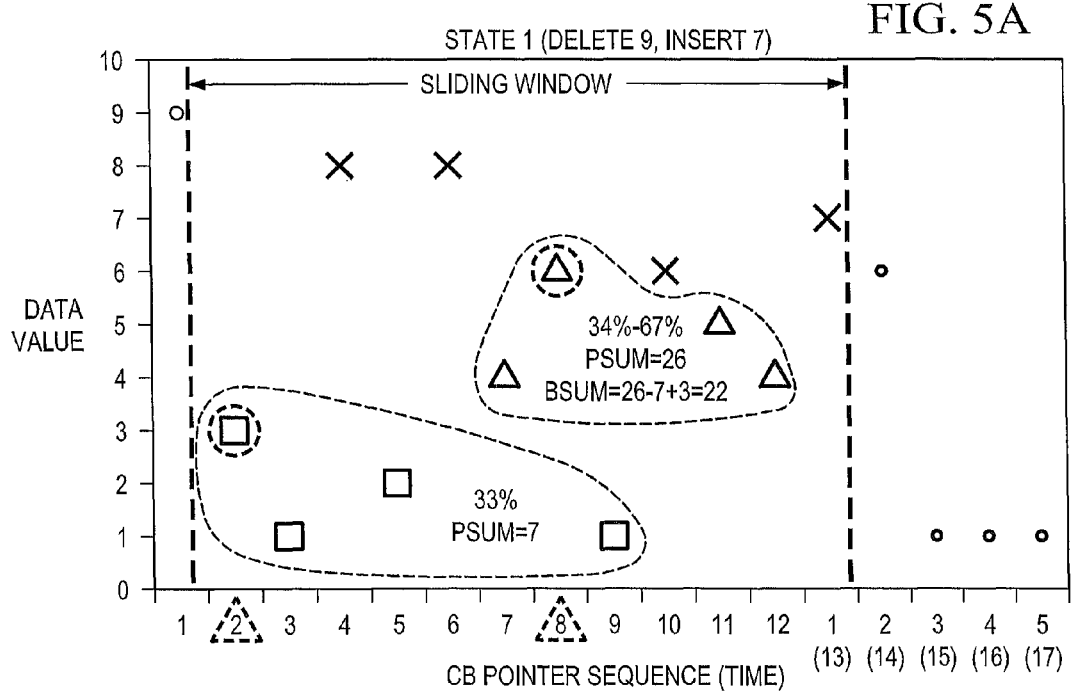
FIG. 5A is a graph of packet delay as a function of time, for packets communicated during a second time window in the example operation of the system of FIG. 1.

As shown in FIG. 5A, the performance monitoring device 214 performs a current $x'_{band\_mean}$ computation for a second τ window ("State 1") that includes the data points 2 through 13. Accordingly, in the example of FIG. 5A (in comparison to the example of FIG. 4A), the performance monitoring device 214 slides the τ window to the right by one data point, so that the data point 1 (whose TE value=9) is replaced within the window by the data point 13 (whose TE value=7). Both of those TE values are greater than the $67^{th}$ percentile value (whose TE value=6 at position number 8 within the circular buffer), so the 33 Pctile PSUM, the 67 Pctile PSUM, and the BSUM are unmodified by such replacement.

Figure 5B:
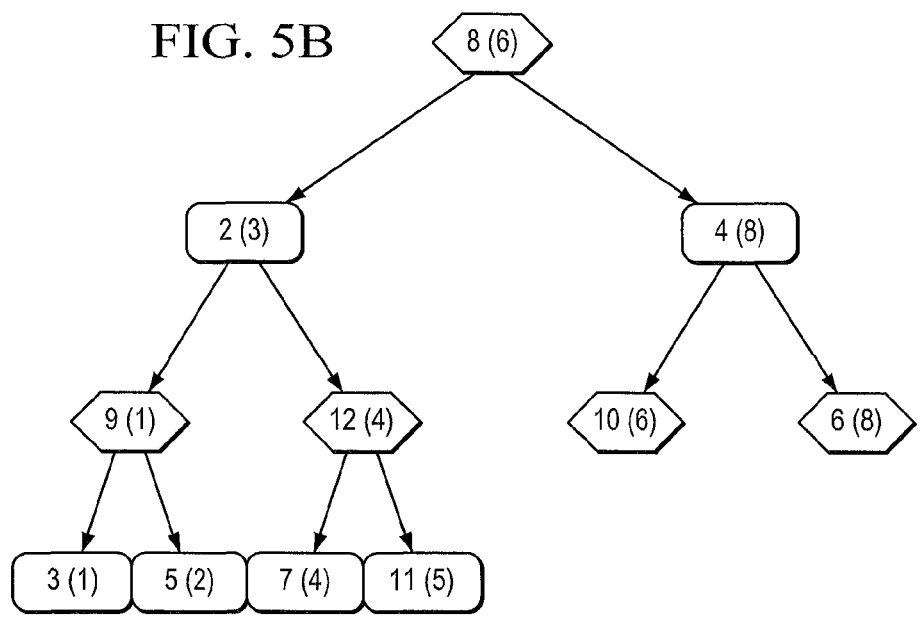
FIG. 5B is an illustration of the data structure of FIG. 4B, as modified by the measuring device of the system of FIG. 1, in response to the packets communicated during the second time window of FIG. 5A.

Accordingly, as shown in FIG. 5B, the performance monitoring device 214: (a) deletes (from the tree) a node associated with the data point 1 that has moved out of the window; and (b) rearranges nodes (within the tree) to comply with conventional rules for a red-black tree data structure.

Figure 5C:
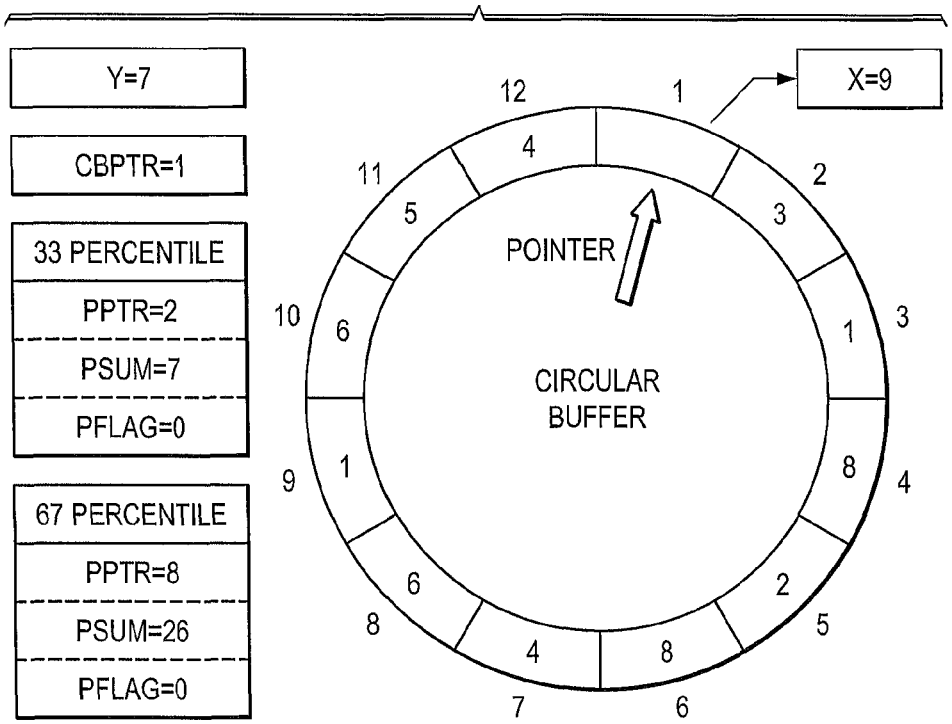
FIG. 5C is an illustration of the circular buffer of FIG. 4C, as modified by the measuring device of the system of FIG. 1, in response to the packets communicated during the second time window of FIG. 5A.

Further, as shown in FIG. 5C, the performance monitoring device 214: (a) deletes (from the circular buffer) the TE value at position number 1 (i.e., the replaced data point 1 whose TE value=9); (b) slides CBPTR to identify position number 1 as the then-current last position within the circular buffer; (c) clears the $33^{rd}$ percentile's PFLAG to 0, because the most recently deleted TE value (X=9) was excluded from the 33 Pctile PSUM computation; and (d) clears the $67^{th}$ percentile's PFLAG to 0, because the most recently deleted TE value (X=9) was excluded from the 67 Pctile PSUM computation. The most recently deleted TE value is shown in FIG. 5C as X=9, and its replacement TE value is shown in FIG. 5C as Y=7.

Figure 5D:
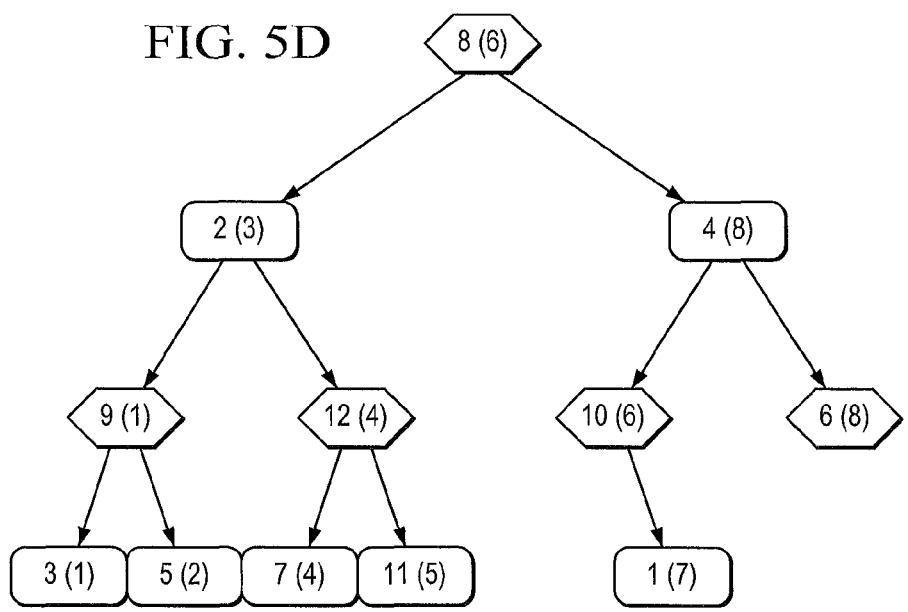
FIG. 5D is an illustration of the data structure of FIG. 5B, as modified by the measuring device of the system of FIG. 1, in response to the packets communicated during the second time window of FIG. 5A.
Figure 5E:
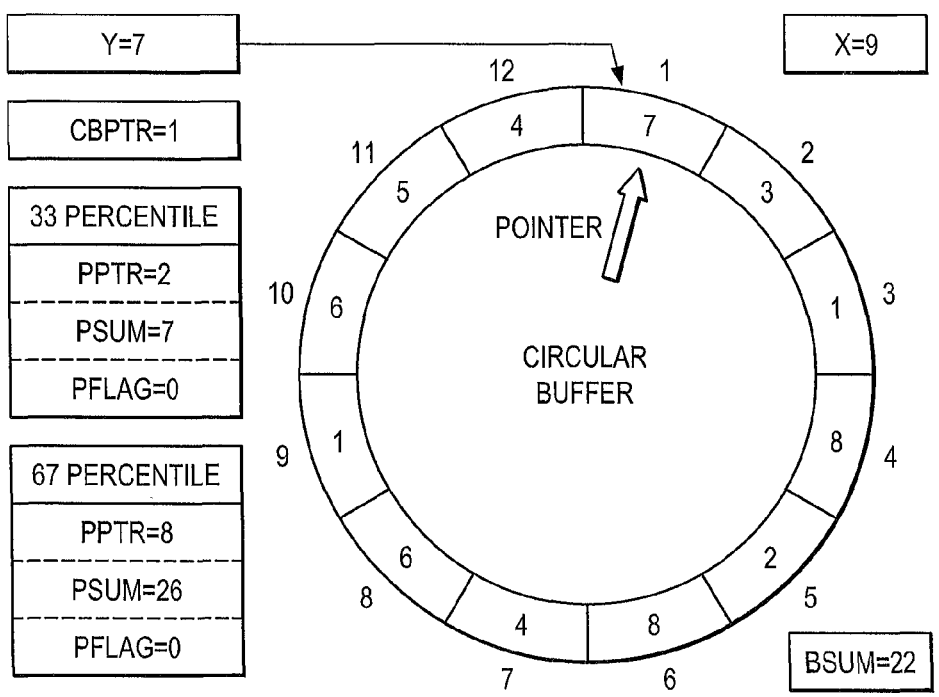
FIG. 5E is an illustration of the circular buffer of FIG. 5C, as modified by the measuring device of the system of FIG. 1, in response to the packets communicated during the second time window of FIG. 5A.

Moreover, as shown in FIG. 5D, the performance monitoring device 214 inserts (into the tree) a node associated with the data point 13 that has moved into the τ window. In the example of FIG. 5D, the performance monitoring device 214 stores (at such node): (a) the data point 13's position number 1 within the circular buffer; and (b) optionally, its TE value=7 (in parentheses). Accordingly, as shown in FIG. 5E, the performance monitoring device 214 inserts (at position number 1 within the circular buffer) the replacement TE value, which is Y=7.

Figure 6A:
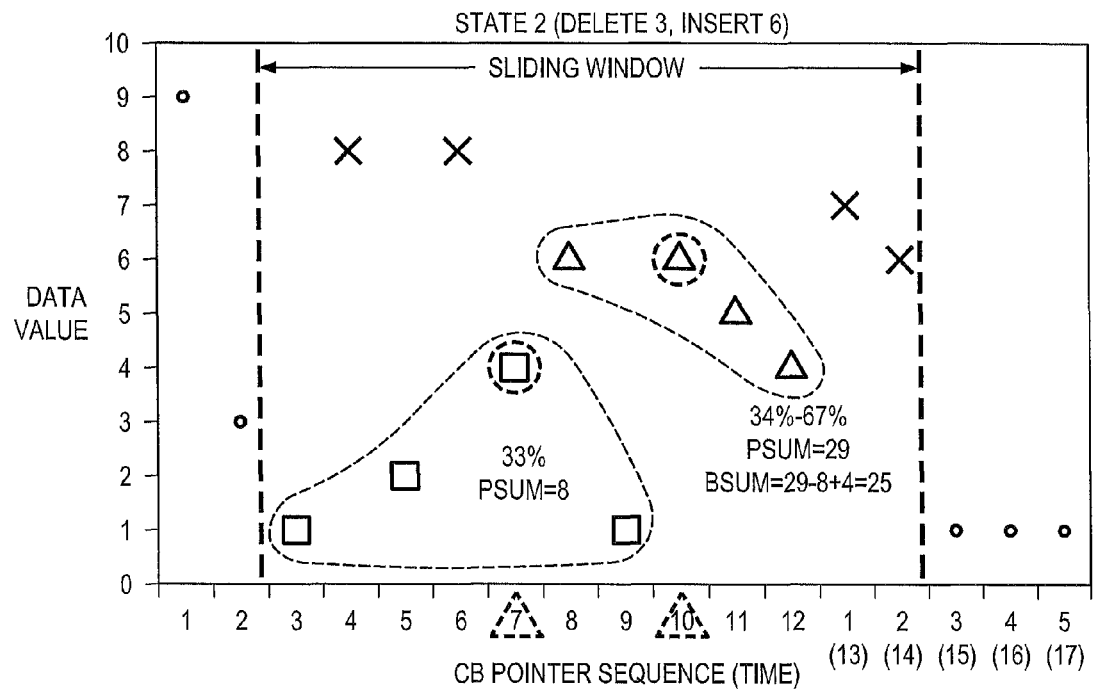
FIG. 6A is a graph of packet delay as a function of time, for packets communicated during a third time window in the example operation of the system of FIG. 1.

As shown in FIG. 6A, the performance monitoring device 214 performs a current $x'_{band\_mean}$ computation for a third τ window ("State 2") that includes the data points 3 through 14. Accordingly, in the example of FIG. 6A (in comparison to the example of FIG. 5A), the performance monitoring device 214 slides the τ window to the right by one data point, so that the data point 2 (whose TE value=3) is replaced within the τ window by the data point 14 (whose TE value=6).

Figure 6B:
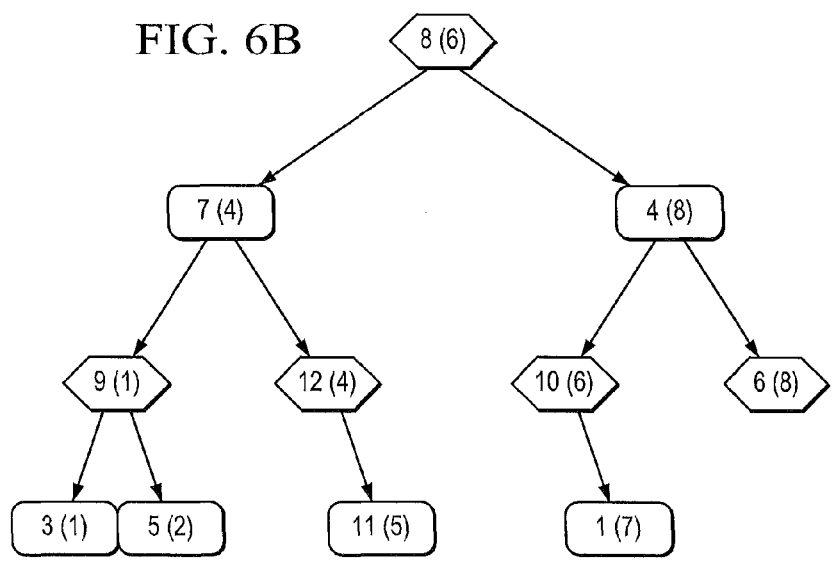
FIG. 6B is an illustration of the data structure of FIG. 5B, as modified by the measuring device of the system of FIG. 1, in response to the packets communicated during the third time window of FIG. 6A.

Accordingly, as shown in FIG. 6B, the performance monitoring device 214: (a) deletes (from the tree) a node associated with the data point 2 that has moved out of the τ window; and (b) rearranges nodes (within the tree) to comply with conventional rules for a red-black tree data structure.

Figure 6C:
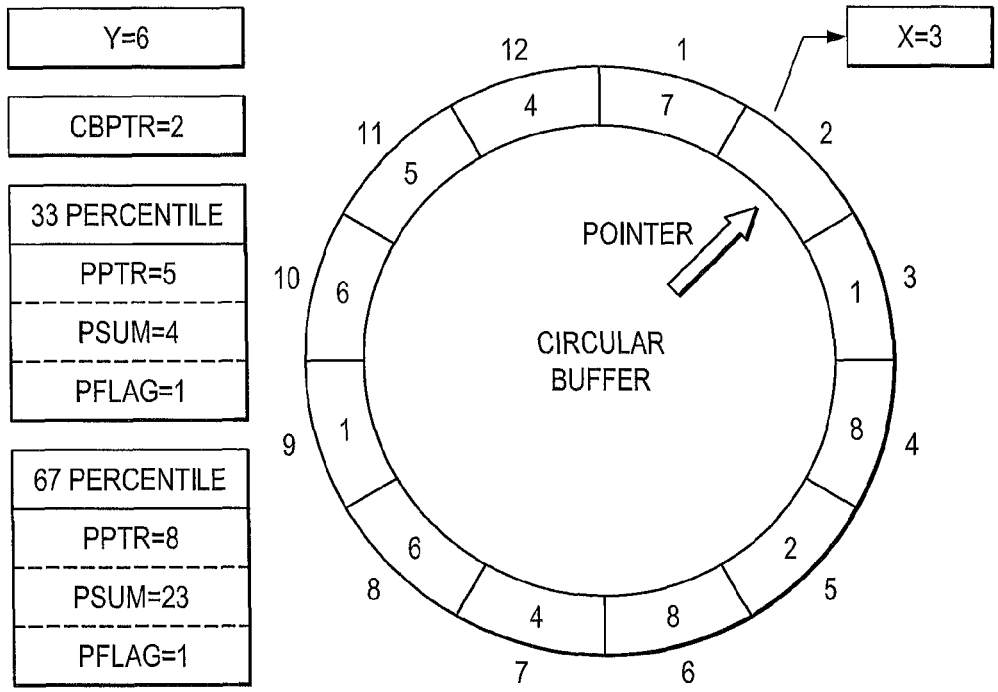
FIG. 6C is an illustration of the circular buffer of FIG. 5C, as modified by the measuring device of the system of FIG. 1, in response to the packets communicated during the third time window of FIG. 6A.

Further, as shown in FIG. 6C, the performance monitoring device 214: (a) deletes (from the circular buffer) the TE value at position number 2 (i.e., the replaced data point 2 whose TE value=3); (b) slides CBPTR to identify position number 2 as the then-current last position within the circular buffer; (c) sets the $33^{rd}$ percentile's PFLAG to 1, because the most recently deleted TE value (X=3) was included within the 33 Pctile PSUM computation; and (d) sets the $67^{th}$ percentile's PFLAG to 1, because the most recently deleted TE value (X=3) was included within the 67 Pctile PSUM computation. The most recently deleted TE value is shown in FIG. 6C as X=3, and its replacement TE value is shown in FIG. 6C as Y=6.

Because the $33^{rd}$ percentile's PFLAG=1, the performance monitoring device 214 subtracts the most recently deleted TE value from the 33 Pctile PSUM, so that the 33 Pctile PSUM changes from 7 to 4, as shown in FIG. 6C. Similarly, because the $67^{th}$ percentile's PFLAG=1, the performance monitoring device 214 subtracts the most recently deleted TE value from the 67 Pctile PSUM, so that the 67 Pctile PSUM changes from 26 to 23, as shown in FIG. 6C.

Also, because the most recently deleted TE value was stored as the $33^{rd}$ percentile value at the 33 Pctile PPTR's position number within the circular buffer, the performance monitoring device 214 replaces the 33 Pctile PPTR by traversing the tree of FIG. 6B to readily identify a next lowest TE value ("LUPREV" operation), relative to such deleted $33^{rd}$ percentile value. Such next lowest TE value is 2 at position number 5 within the circular buffer, so the performance monitoring device 214 changes the 33 Pctile PPTR to 5, as shown in FIG. 6C.

Figure 6D:
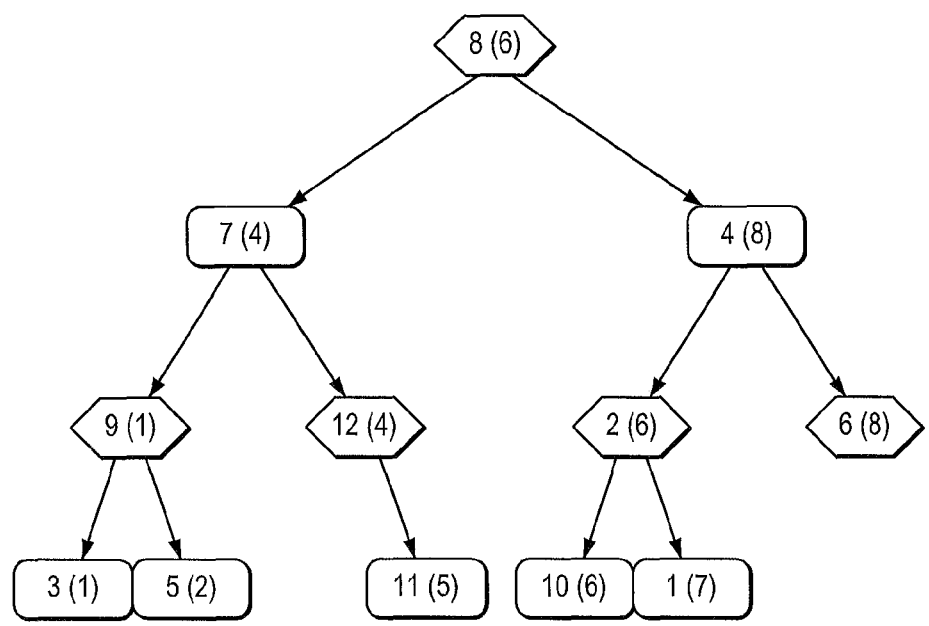
FIG. 6D is an illustration of the data structure of FIG. 6B, as modified by the measuring device of the system of FIG. 1, in response to the packets communicated during the third time window of FIG. 6A.
Figure 6E:
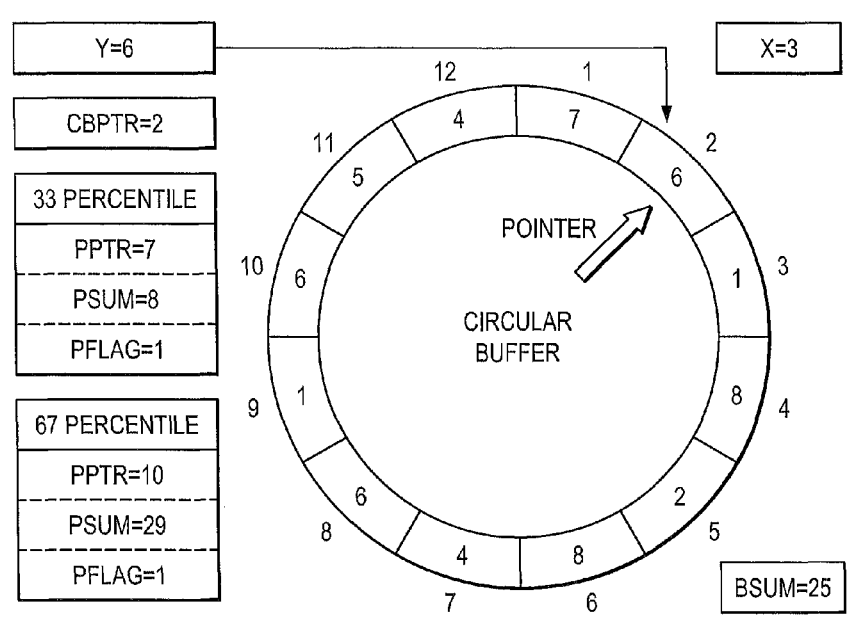
FIG. 6E is an illustration of the circular buffer of FIG. 6C, as modified by the measuring device of the system of FIG. 1, in response to the packets communicated during the third time window of FIG. 6A.

Moreover, as shown in FIG. 6D, the performance monitoring device 214 inserts (into the tree) a node associated with the data point 14 that has moved into the τ window. In the example of FIG. 6D, the performance monitoring device 214 stores (at such node): (a) the data point 14's position number 2 within the circular buffer; and (b) optionally, its TE value=6 (in parentheses). Accordingly, as shown in FIG. 6D, the performance monitoring device 214 rearranges nodes (within the tree) to comply with conventional rules for a red-black tree data structure. Similarly, as shown in FIG. 6E, the performance monitoring device 214 inserts (at position number 2 within the circular buffer) the replacement TE value, which is Y=6.

Because the $33^{rd}$ percentile's PFLAG=1, and because the replacement TE value (Y=6) is neither less than nor equal to the $33^{rd}$ percentile value of 3 (at the 33 Pctile PPTR's position number 2 within the circular buffer of FIG. 5E), the performance monitoring device 214 traverses the tree of FIG. 6D to readily identify a next highest TE value ("LUNEXT" operation), relative to the $33^{rd}$ percentile value. Such next highest TE value is 4 at position number 7 within the circular buffer, so the performance monitoring device 214: (a) changes the 33 Pctile PPTR to 7, as shown in FIG. 6E; and (b) adds such next highest TE value of 4 to the 33 Pctile PSUM, so that the 33 Pctile PSUM changes from 4 to 8, as shown in FIG. 6E.

Similarly, because the $67^{th}$ percentile's PFLAG=1, and because the replacement TE value (Y=6) is neither less than nor equal to the $33^{rd}$ percentile value of 3 (at the 33 Pctile PPTR's position number 2 within the circular buffer of FIG. 5E) and is not less than the $67^{th}$ percentile value of 6 (at the 67 Pctile PPTR's position number 8 within the circular buffer of FIG. 5E), the performance monitoring device 214 traverses the tree of FIG. 6D to readily identify a next highest TE value ("LUNEXT" operation), relative to the $67^{th}$ percentile value. Such next highest TE value is 6 at position number 10 within the circular buffer, so the performance monitoring device 214: (a) changes the 67 Pctile PPTR to 10, as shown in FIG. 6E; and (b) adds such next highest TE value of 6 to the 67 Pctile PSUM, so that the 67 Pctile PSUM changes from 23 to 29, as shown in FIG. 6E.

Further, the performance monitoring device 214 computes BSUM by subtracting the 33 Pctile PSUM from the 67 Pctile PSUM, and by then adding the $33^{rd}$ percentile value (i.e., the TE value at the 33 Pctile PPTR's position number). Accordingly, the performance monitoring device 214 computes BSUM=29−8+4=25, as shown in FIG. 6E.

Notably, in the example of FIG. 6A, data point 7 has a TE value=4, and data point 12 likewise has a TE value=4. Nevertheless, the lowest 33% (of TE values within the τ window) has space for only one of the data points 7 and 12. In that case, the performance monitoring device 214 breaks the tie by selecting the oldest of such data points (i.e., data point 7) for inclusion within such lowest 33%.

Similarly, in the example of FIG. 6A, data point 8 has a TE value=6, data point 10 likewise has a TE value=6, and data point 14 also has a TE value=6. Nevertheless, the next lowest 34% (of TE values within the τ window) has space for only two of the data points 8, 10 and 14. In that case, the performance monitoring device 214 breaks the tie by selecting the oldest of such data points (i.e., data points 8 and 10) for inclusion within such next lowest 34%.

Figure 7A:
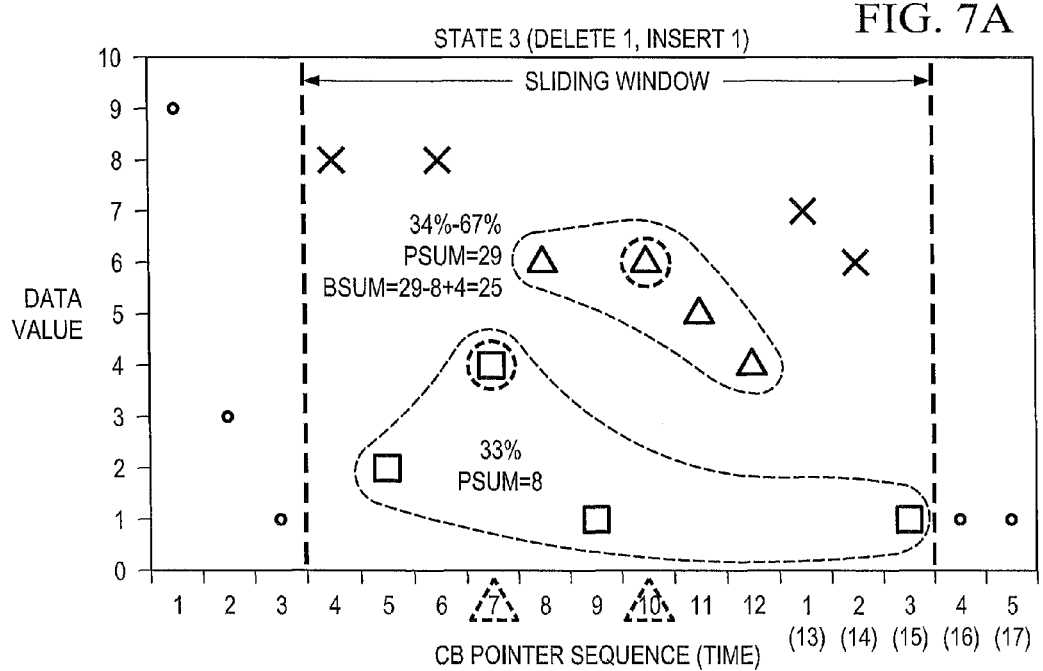
FIG. 7A is a graph of packet delay as a function of time, for packets communicated during a fourth time window in the example operation of the system of FIG. 1.

As shown in FIG. 7A, the performance monitoring device 214 performs a current $x'_{band\_mean}$ computation for a fourth τ window ("State 3") that includes the data points 4 through 15. Accordingly, in the example of FIG. 7A (in comparison to the example of FIG. 6A), the performance monitoring device 214 slides the τ window to the right by one data point, so that the data point 3 (whose TE value=1) is replaced within the τ window by the data point 15 (whose TE value=1). Both of those TE values are the same as one another, so the 33 Pctile PPTR, the 33 Pctile PSUM, the 67 Pctile PPTR, the 67 Pctile PSUM, and the BSUM are unmodified by such replacement.

Figure 7B:
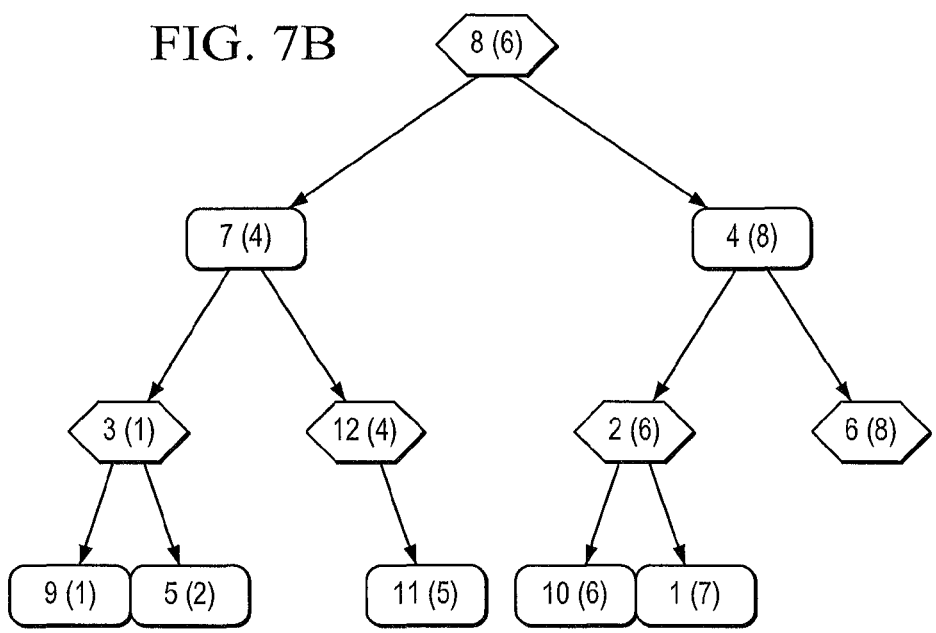
FIG. 7B is an illustration of the data structure of FIG. 6B, as modified by the measuring device of the system of FIG. 1, in response to the packets communicated during the fourth time window of FIG. 7A.

Accordingly, as shown in FIG. 7B, the performance monitoring device 214: (a) deletes (from the tree) a node associated with the data point 3 that has moved out of the τ window; (b) inserts (into the tree) a node associated with the data point 15 that has moved into the τ window; and (c) rearranges nodes (within the tree) to comply with conventional rules for a red-black tree data structure. In the example of FIG. 7B, the performance monitoring device 214 stores (at such inserted node): (a) the data point 15's position number 3 within the circular buffer; and (b) optionally, its TE value=1 (in parentheses).

Figure 7C:
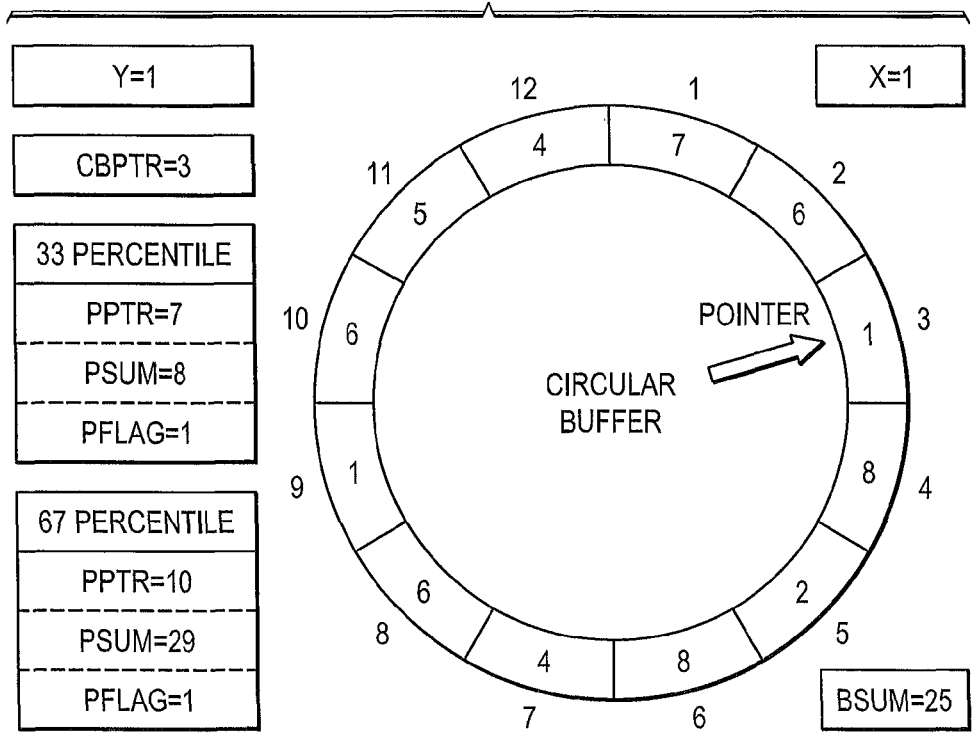
FIG. 7C is an illustration of the circular buffer of FIG. 6C, as modified by the measuring device of the system of FIG. 1, in response to the packets communicated during the fourth time window of FIG. 7A.

Further, as shown in FIG. 7C, the performance monitoring device 214: (a) slides CBPTR to identify position number 3 as the then-current last position within the circular buffer; (b) sets the $33^{rd}$ percentile's PFLAG to 1, because the most recently deleted TE value (X=1) was included within the 33 Pctile PSUM computation; (c) sets the $67^{th}$ percentile's PFLAG to 1, because the most recently deleted TE value (X=1) was included within the 67 Pctile PSUM computation; and (d) inserts (at position number 3 within the circular buffer) the replacement TE value, which is Y=1. The most recently deleted TE value is shown in FIG. 7C as X=1, and its replacement TE value is shown in FIG. 7C as Y=1.

Figure 8A:
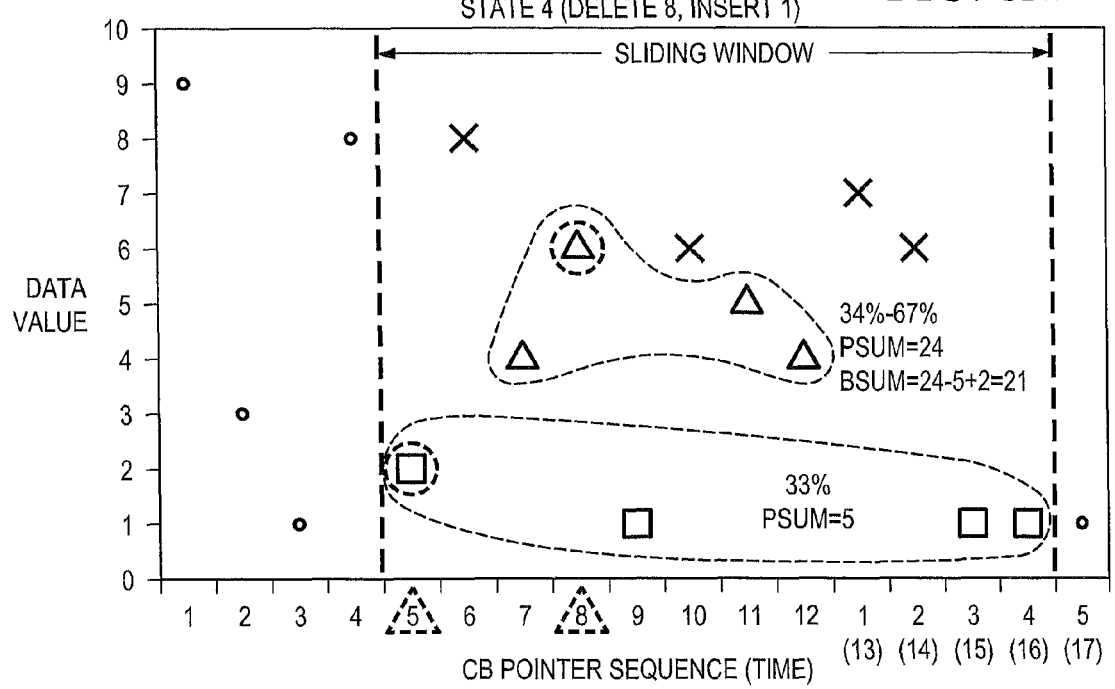
FIG. 8A is a graph of packet delay as a function of time, for packets communicated during a fifth time window in the example operation of the system of FIG. 1.

As shown in FIG. 8A, the performance monitoring device 214 performs a current $x'_{band\_mean}$ computation for a fifth τ window ("State 4") that includes the data points 5 through 16. Accordingly, in the example of FIG. 8A (in comparison to the example of FIG. 7A), the performance monitoring device 214 slides the τ window to the right by one data point, so that the data point 4 (whose TE value=8) is replaced within the τ window by the data point 16 (whose TE value=1).

Figure 8B:
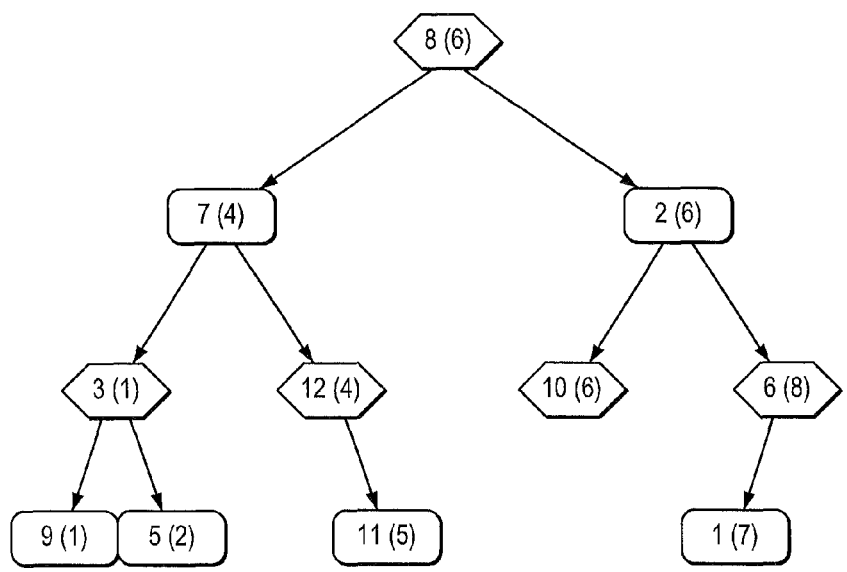
FIG. 8B is an illustration of the data structure of FIG. 7B, as modified by the measuring device of the system of FIG. 1, in response to the packets communicated during the fifth time window of FIG. 8A.

Accordingly, as shown in FIG. 8B, the performance monitoring device 214: (a) deletes (from the tree) a node associated with the data point 4 that has moved out of the τ window; and (b) rearranges nodes (within the tree) to comply with conventional rules for a red-black tree data structure.

Figure 8C:
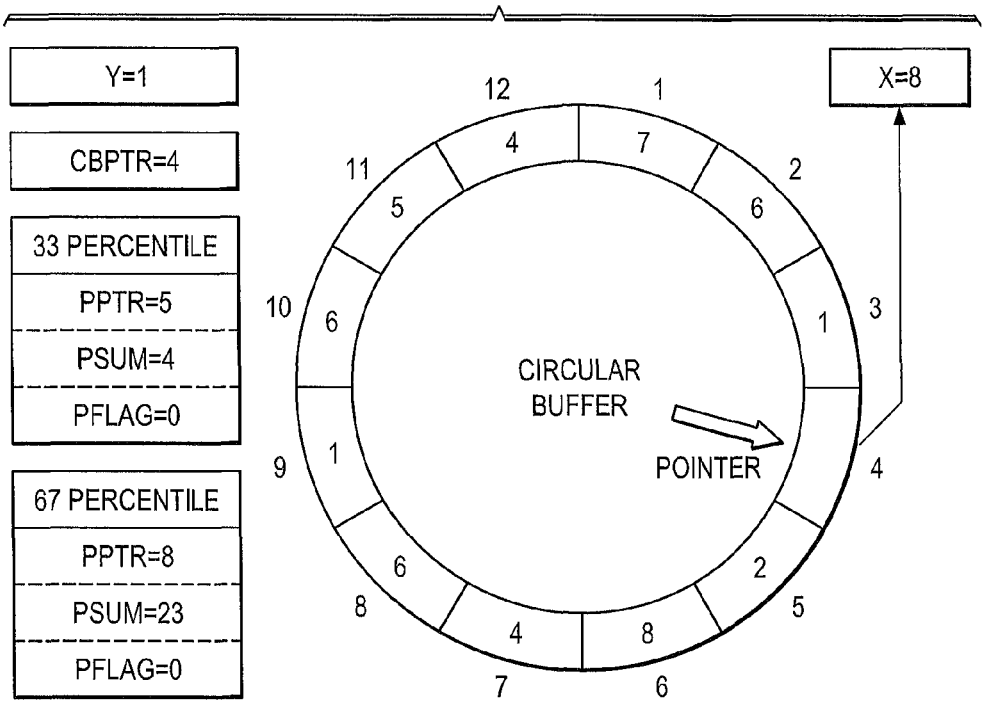
FIG. 8C is an illustration of the circular buffer of FIG. 7C, as modified by the measuring device of the system of FIG. 1, in response to the packets communicated during the fifth time window of FIG. 8A.

Further, as shown in FIG. 8C, the performance monitoring device 214: (a) deletes (from the circular buffer) the TE value at position number 4 (i.e., the replaced data point 4 whose TE value=8); (b) slides CBPTR to identify position number 4 as the then-current last position within the circular buffer; (c) clears the $33^{rd}$ percentile's PFLAG to 0, because the most recently deleted TE value (X=8) was excluded from the 33 Pctile PSUM computation; and (d) clears the $67^{th}$ percentile's PFLAG to 0, because the most recently deleted TE value (X=8) was excluded from the 67 Pctile PSUM computation. The most recently deleted TE value is shown in FIG. 8C as X=8, and its replacement TE value is shown in FIG. 8C as Y=1.

Because the $33^{rd}$ percentile's PFLAG=0, and because the replacement TE value (Y=1) is less than or equal to the $33^{rd}$ percentile value of 4 (at the 33 Pctile PPTR's position number 7 within the circular buffer of FIG. 7C), the performance monitoring device 214: (a) subtracts the $33^{rd}$ percentile value from the 33 Pctile PSUM, so that the 33 Pctile PSUM changes from 8 to 4, as shown in FIG. 8C; and (b) traverses the tree of FIG. 8B to readily identify a next lowest TE value ("LUPREV" operation), relative to the $33^{rd}$ percentile value. Such next lowest TE value is 2 at position number 5 within the circular buffer, so the performance monitoring device 214 changes the 33 Pctile PPTR to 5, as shown in FIG. 8C.

Similarly, because the $67^{th}$ percentile's PFLAG=0, and because the replacement TE value (Y=1) is less than the $67^{th}$ percentile value of 6 (at the 67 Pctile PPTR's position number 10 within the circular buffer of FIG. 7C), the performance monitoring device 214: (a) subtracts the $67^{th}$ percentile value from the 67 Pctile PSUM, so that the 67 Pctile PSUM changes from 29 to 23, as shown in FIG. 8C; and (b) traverses the tree of FIG. 8B to readily identify a next lowest TE value ("LUPREV" operation), relative to the $67^{th}$ percentile value. Such next lowest TE value is 6 at position number 8 within the circular buffer, so the performance monitoring device 214 changes the 67 Pctile PPTR to 8, as shown in FIG. 8C.

Figure 8D:
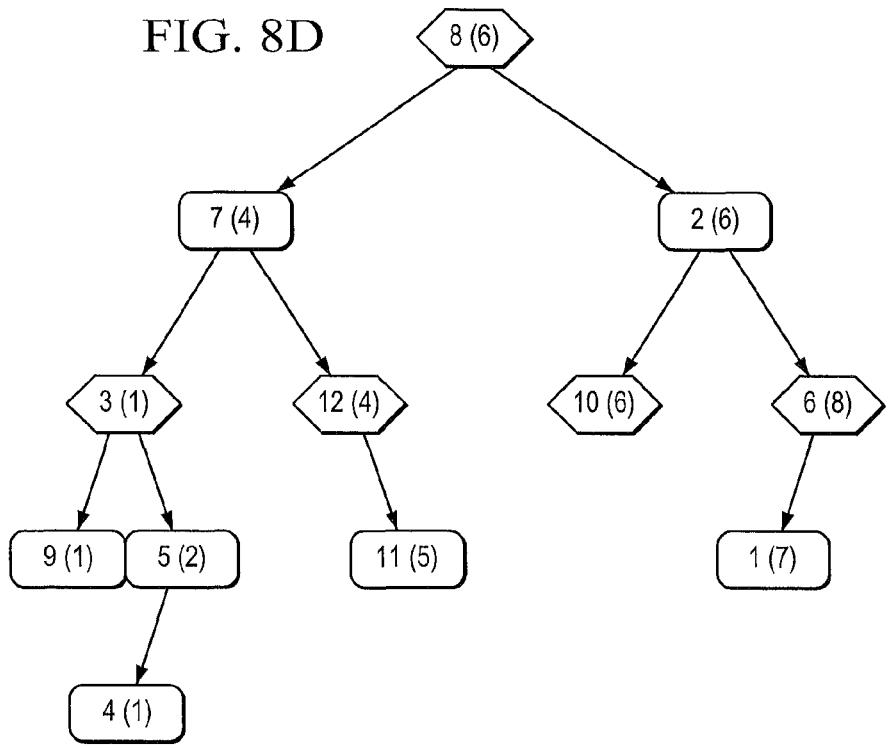
FIG. 8D is an illustration of the data structure of FIG. 8B, as modified by the measuring device of the system of FIG. 1, in response to the packets communicated during the fifth time window of FIG. 8A.

Moreover, as shown in FIG. 8D, the performance monitoring device 214 inserts (into the tree) a node associated with the data point 16 that has moved into the τ window. In the example of FIG. 8D, the performance monitoring device 214 stores (at such node): (a) the data point 16's position number 4 within the circular buffer; and (b) optionally, its TE value=1 (in parentheses). Accordingly, as shown in FIG. 8D, the performance monitoring device 214 rearranges nodes (within the tree) to comply with conventional rules for a red-black tree data structure.

Figure 8E:
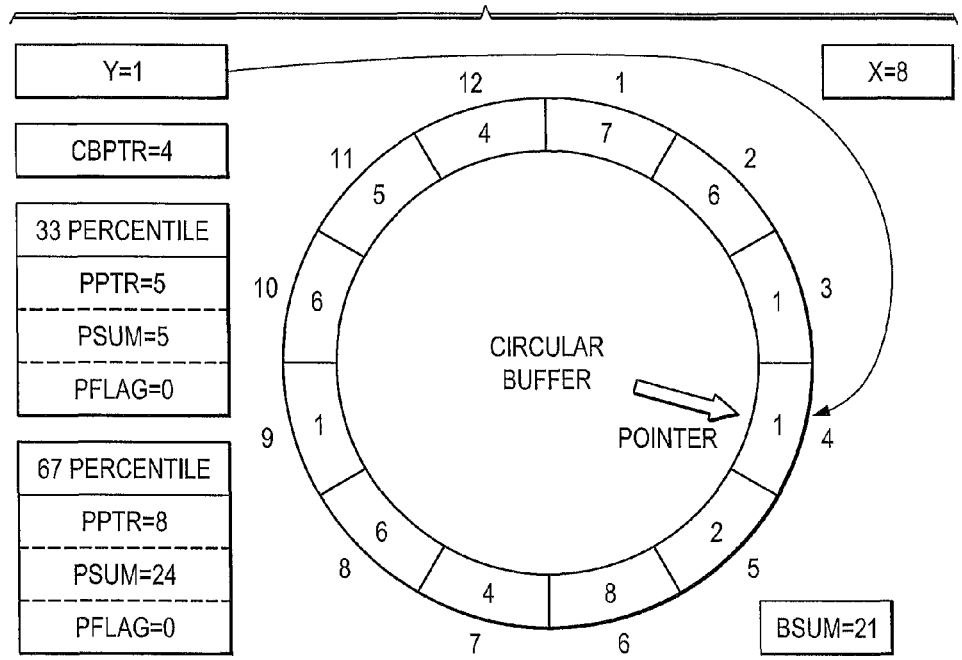
FIG. 8E is an illustration of the circular buffer of FIG. 8C, as modified by the measuring device of the system of FIG. 1, in response to the packets communicated during the fifth time window of FIG. 8A.

Similarly, as shown in FIG. 8E, the performance monitoring device 214: (a) inserts (at position number 4 within the circular buffer) the replacement TE value, which is Y=1; (b) adds the replacement TE value (Y=1) to the 33 Pctile PSUM, so that the 33 Pctile PSUM changes from 4 to 5, as shown in FIG. 8E; and (c) adds the replacement TE value (Y=1) to the 67 Pctile PSUM, so that the 67 Pctile PSUM changes from 23 to 24, as shown in FIG. 8E.

Further, the performance monitoring device 214 computes BSUM by subtracting the 33 Pctile PSUM from the 67 Pctile PSUM, and by then adding the $33^{rd}$ percentile value (i.e., the TE value at the 33 Pctile PPTR's position number). Accordingly, the performance monitoring device 214 computes BSUM=24−5+2=21, as shown in FIG. 8E.

Figure 9A:
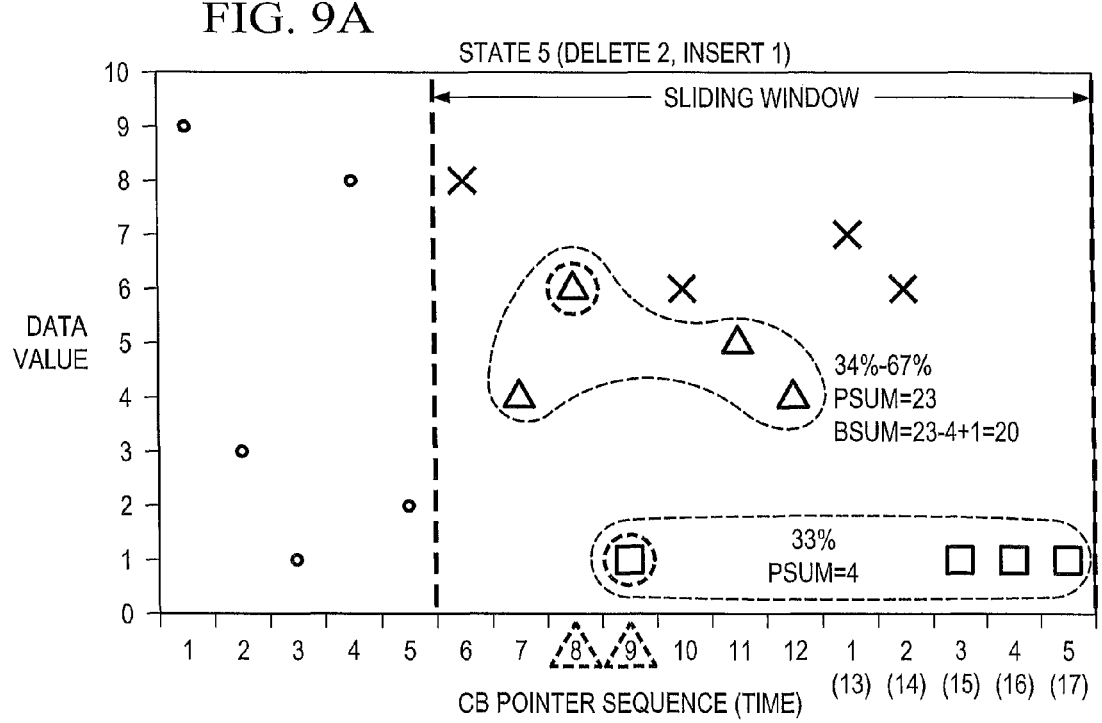
FIG. 9A is a graph of packet delay as a function of time, for packets communicated during a sixth time window in the example operation of the system of FIG. 1.

As shown in FIG. 9A, the performance monitoring device 214 performs a current $x'_{band\_mean}$ computation for a sixth t window ("State 5") that includes the data points 6 through 17. Accordingly, in the example of FIG. 9A (in comparison to the example of FIG. 8A), the performance monitoring device 214 slides the T window to the right by one data point, so that the data point 5 (whose TE value=2) is replaced within the τ window by the data point 17 (whose TE value=1).

Figure 9B:
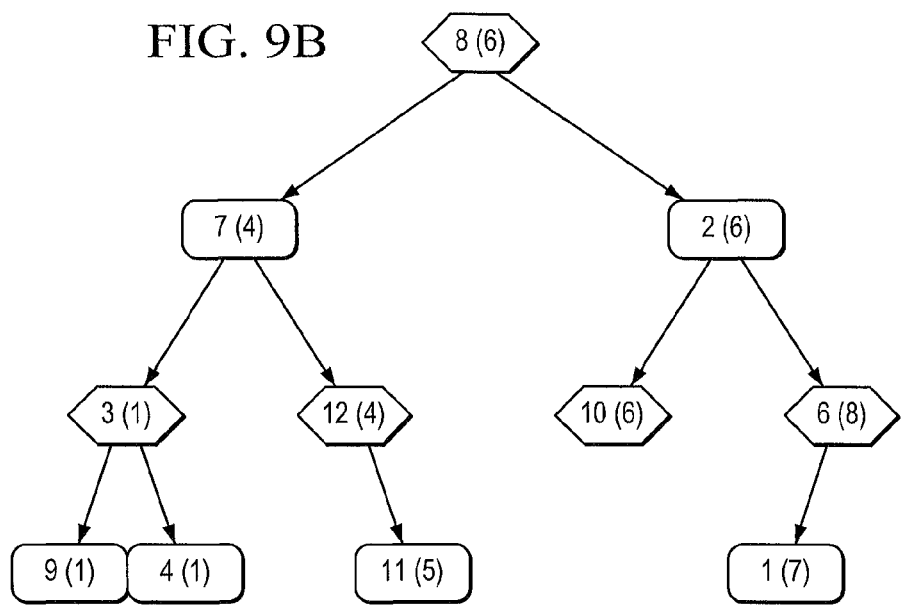
FIG. 9B is an illustration of the data structure of FIG. 8B, as modified by the measuring device of the system of FIG. 1, in response to the packets communicated during the sixth time window of FIG. 9A.

Accordingly, as shown in FIG. 9B, the performance monitoring device 214: (a) deletes (from the tree) a node associated with the data point 5 that has moved out of the τ window; and (b) rearranges nodes (within the tree) to comply with conventional rules for a red-black tree data structure.

Figure 9C:
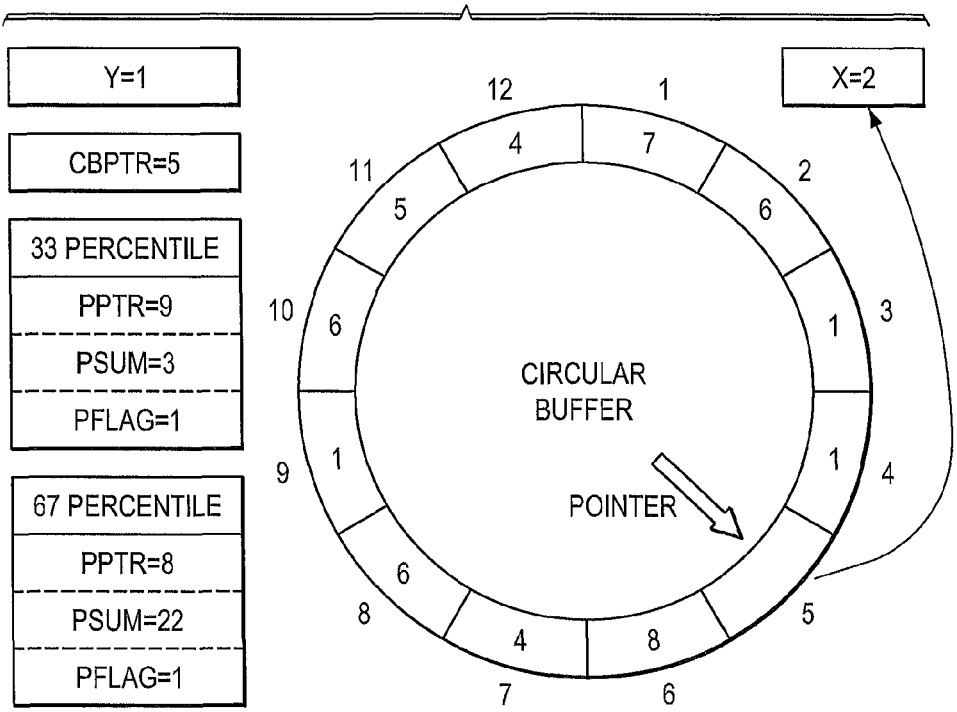
FIG. 9C is an illustration of the circular buffer of FIG. 8C, as modified by the measuring device of the system of FIG. 1, in response to the packets communicated during the sixth time window of FIG. 9A.

Further, as shown in FIG. 9C, the performance monitoring device 214: (a) deletes (from the circular buffer) the TE value at position number 5 (i.e., the replaced data point 5 whose TE value=2); (b) slides CBPTR to identify position number 5 as the then-current last position within the circular buffer; (c) sets the $33^{rd}$ percentile's PFLAG to 1, because the most recently deleted TE value (X=2) was included within the 33 Pctile PSUM computation; and (d) sets the $67^{th}$ percentile's PFLAG to 1, because the most recently deleted TE value (X=2) was included within the 67 Pctile PSUM computation. The most recently deleted TE value is shown in FIG. 9C as X=2, and its replacement TE value is shown in FIG. 9C as Y=1.

Because the $33^{rd}$ percentile's PFLAG=1, the performance monitoring device 214 subtracts the most recently deleted TE value from the 33 Pctile PSUM, so that the 33 Pctile PSUM changes from 5 to 3, as shown in FIG. 9C. Similarly, because the $67^{th}$ percentile's PFLAG=1, the performance monitoring device 214 subtracts the most recently deleted TE value from the 67 Pctile PSUM, so that the 67 Pctile PSUM changes from 24 to 22, as shown in FIG. 9C.

Also, because the most recently deleted TE value was stored as the $33^{rd}$ percentile value at the 33 Pctile PPTR's position number within the circular buffer, the performance monitoring device 214 replaces the 33 Pctile PPTR by traversing the tree of FIG. 9B to readily identify a next lowest TE value ("LUPREV" operation), relative to such deleted $33^{rd}$ percentile value. Such next lowest TE value is 1 at position number 9 within the circular buffer, so the performance monitoring device 214 changes the 33 Pctile PPTR to 9, as shown in FIG. 9C.

Figure 9D:
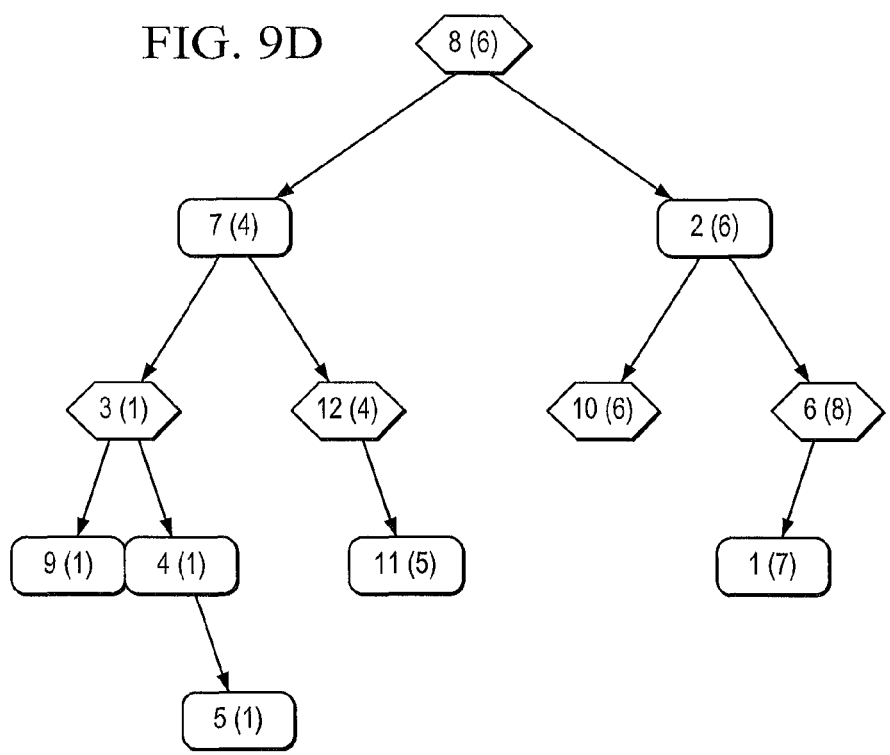
FIG. 9D is an illustration of the data structure of FIG. 9B, as modified by the measuring device of the system of FIG. 1, in response to the packets communicated during the sixth time window of FIG. 9A.

Moreover, as shown in FIG. 9D, the performance monitoring device 214 inserts (into the tree) a node associated with the data point 17 that has moved into the τ window. In the example of FIG. 9D, the performance monitoring device 214 stores (at such node): (a) the data point 17's position number 5 within the circular buffer; and (b) optionally, its TE value=1 (in parentheses). Accordingly, as shown in FIG. 9D, the performance monitoring device 214 rearranges nodes (within the tree) to comply with conventional rules for a red-black tree data structure.

Figure 9E:
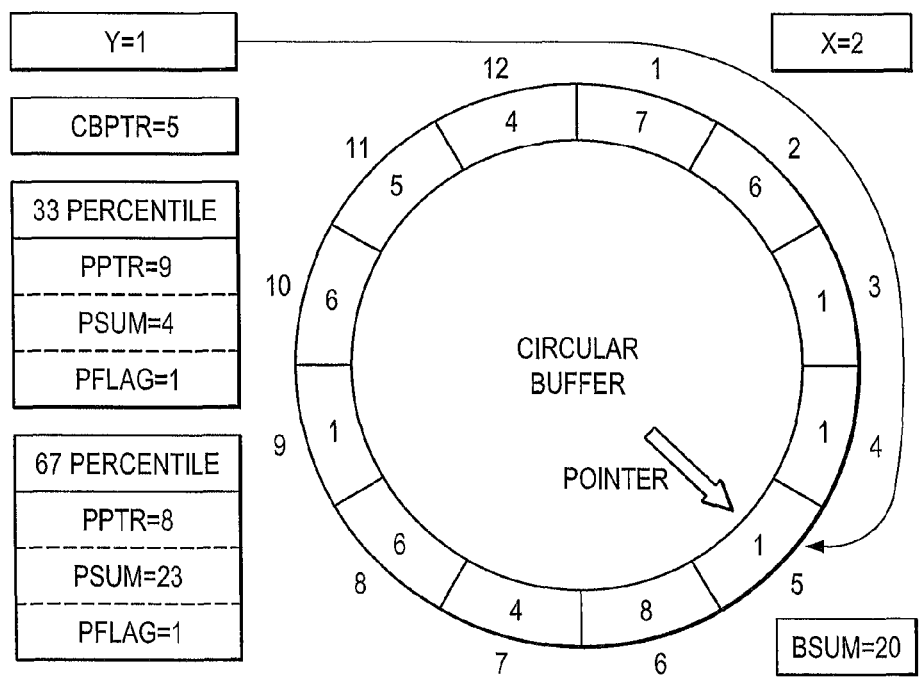
FIG. 9E is an illustration of the circular buffer of FIG. 9C, as modified by the measuring device of the system of FIG. 1, in response to the packets communicated during the sixth time window of FIG. 9A.

Similarly, as shown in FIG. 9E, the performance monitoring device 214: (a) inserts (at position number 5 within the circular buffer) the replacement TE value, which is Y=1; (b) adds the replacement TE value (Y=1) to the 33 Pctile PSUM, so that the 33 Pctile PSUM changes from 3 to 4, as shown in FIG. 9E, because the $33^{rd}$ percentile's PFLAG=1, and because the replacement TE value (Y=1) is less than or equal to the $33^{rd}$ percentile value of 2 (at the 33 Pctile PPTR's position number 5 within the circular buffer of FIG. 8E); and (c) adds the replacement TE value (Y=1) to the 67 Pctile PSUM, so that the 67 Pctile PSUM changes from 22 to 23, as shown in FIG. 9E, because the $67^{th}$ percentile's PFLAG=1, and because the replacement TE value (Y=1) is less than the $67^{th}$ percentile value of 6 (at the 67 Pctile PPTR's position number 8 within the circular buffer of FIG. 8E).

Further, the performance monitoring device 214 computes BSUM by subtracting the 33 Pctile PSUM from the 67 Pctile PSUM, and by then adding the $33^{rd}$ percentile value (i.e., the TE value at the 33 Pctile PPTR's position number). Accordingly, the performance monitoring device 214 computes BSUM=23−4+1=20, as shown in FIG. 9E.

Figure 10:
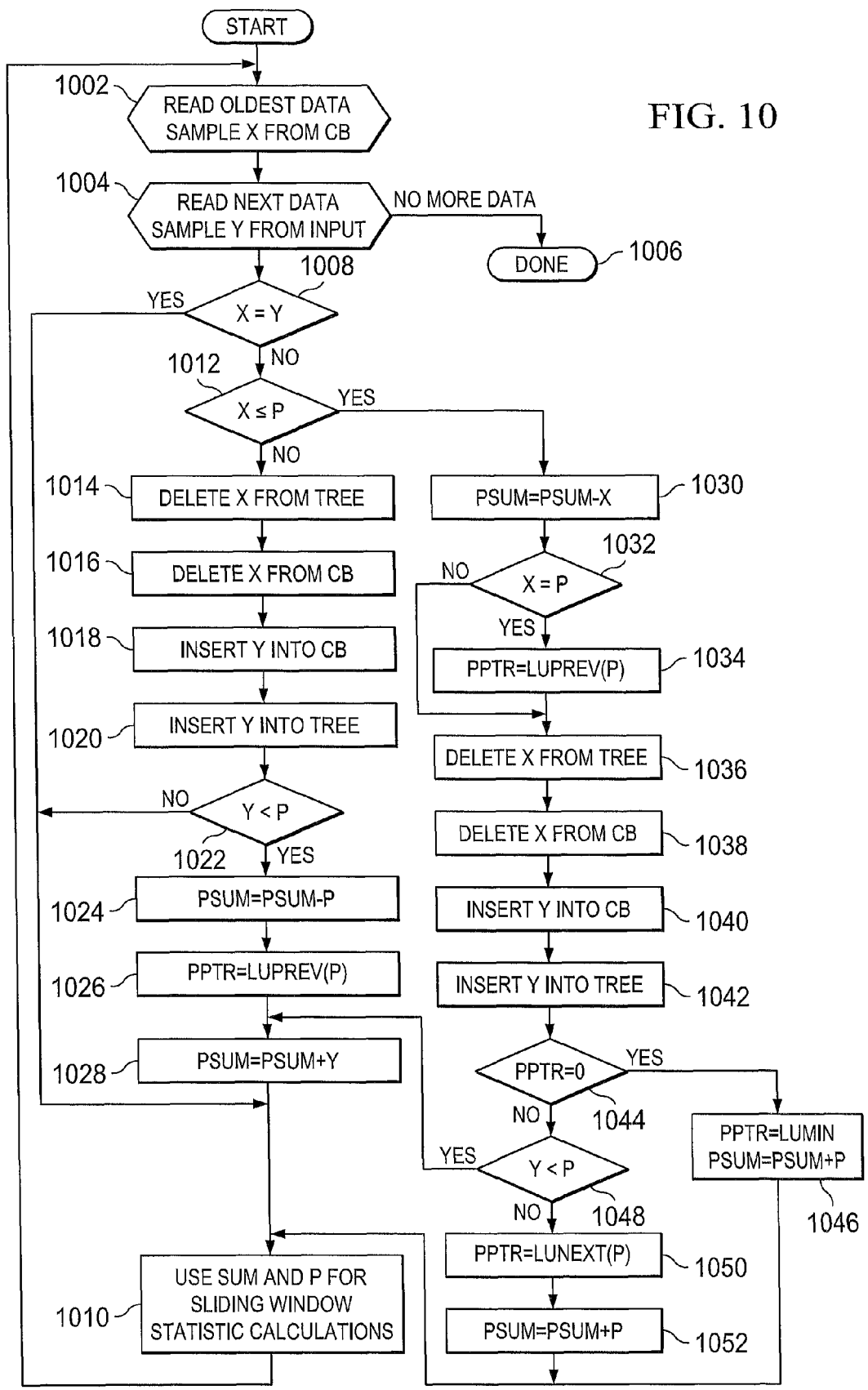
FIG. 10 is a flowchart of a first operation of the measuring device of the system of FIG. 1.

FIG. 10 is a flowchart of a first operation of the measuring device 102, in which the measuring device 102 performs a Pctile PSUM computation (e.g., the 33 Pctile PSUM computation). Initially, starting at the first TE value ($x_1$) from among the total number N of TE values, the performance monitoring device 214 stores the first n values (n data samples) in the circular buffer ("CB"). The operation begins at a step 1002, at which the device 214 reads the then-current oldest data sample ("X") from the CB.

After the step 1002, the operation continues to a step 1004, at which the device 214 reads (from among the total number N of TE values) the then-current next data sample ("Y") that the device 214 has not already stored in the CB. If the device 214 has already read (and stored in the CB) all N of the TE values before the step 1004, then the operation continues from the step 1004 to a step 1006, at which the operation ends. Conversely, if the device 214 has not already read (and stored in the CB) all N of the TE values before the step 1004, then the operation continues from the step 1004 to a step 1008, at which the device 214 determines whether X=Y (i.e., whether the value of X equals the value of Y).

If X=Y, then the then-current value of PSUM ("SUM") and the then-current value at the PPTR position within the CB ("P") will remain unchanged, and the operation continues from the step 1008 to a step 1010, at which the device 214 uses SUM and P for its sliding window statistics calculations. After the step 1010, the operation returns to the step 1002.

Referring again to the step 1008, if X≠Y, then the operation continues from the step 1008 to a step 1012, at which the device 214 determines whether X≤P (i.e., whether the value of X is less than or equal to the value of P). If X>P, then SUM and P will remain unchanged by deletion of X from the CB, and the operation continues from the step 1012 to a step 1014, at which the device 214 deletes X from the red-black tree data structure and rearranges nodes thereof to comply with conventional rules for a red-black tree data structure. After the step 1014, the operation continues to a step 1016, at which the device 214 deletes X from the CB. After the step 1016, the operation continues to a step 1018, at which the device 214 inserts Y into the CB. After the step 1018, the operation continues to a step 1020, at which the device 214 inserts Y into the red-black tree data structure and rearranges nodes thereof to comply with conventional rules for a red-black tree data structure.

After the step 1020, the operation continues to a step 1022, at which the device 214 determines whether Y<P (i.e., whether the value of Y is less than the value of P). If Y≥P, then SUM and P will remain unchanged by insertion of Y into the CB, and the operation continues from the step 1022 to the step 1010. Conversely, if Y<P, then SUM and P will change by insertion of Y into the CB, and the operation continues from the step 1022 to a step 1024, at which the device 214 reduces PSUM by the value of P.

After the step 1024, the operation continues to a step 1026, at which the device 214 changes the PPTR position to be the position of a next lowest value within the CB. After the step 1026, the operation continues to a step 1028, at which the device 214 increases PSUM by the value of Y. After the step 1028, the operation continues to the step 1010.

Referring again to the step 1012, if X≤P, then SUM and P will change by deletion of X from the CB, and the operation continues from the step 1012 to a step 1030, at which the device 214 reduces PSUM by the value of X. After the step 1030, the operation continues to a step 1032, at which the device 214 determines whether X=P (i.e., whether the value of X was stored as the value of P). If X=P, then the operation continues from the step 1032 to a step 1034, at which the device 214 changes the PPTR position to be the position of a next lowest value within the CB. At the start of the step 1034 operation, if the PPTR position is already the position of a lowest value within the CB, then PPTR=0 at the end of the step 1034 operation. After the step 1034, the operation continues to a step 1036.

Referring again to the step 1032, if X≠P, then the operation continues from the step 1032 to the step 1036, at which the device 214 deletes X from the red-black tree data structure and rearranges nodes thereof to comply with conventional rules for a red-black tree data structure. After the step 1036, the operation continues to a step 1038, at which the device 214 deletes X from the CB. After the step 1038, the operation continues to a step 1040, at which the device 214 inserts Y into the CB. After the step 1040, the operation continues to a step 1042, at which the device 214 inserts Y into the red-black tree data structure and rearranges nodes thereof to comply with conventional rules for a red-black tree data structure.

After the step 1042, the operation continues to a step 1044, at which the device 214 determines whether PPTR=0. If PPTR=0, then the operation continues to a step 1046, at which the device 214: (a) changes the PPTR position to the position of a lowest value within the CB; and (b) increases PSUM by the value of P. After the step 1046, the operation continues to the step 1010.

Referring again to the step 1044, if PPTR≠0, then the operation continues from the step 1044 to a step 1048, at which the device 214 determines whether Y<P (i.e., whether the value of Y is less than the value of P). If Y<P, then the operation continues from the step 1048 to the step 1028. Conversely, if Y≥P, then the operation continues from the step 1048 to a step 1050, at which the device 214 changes the PPTR position to be the position of a next highest value within the CB. After the step 1050, the operation continues to a step 1052, at which the device 214 increases PSUM by the value of P. After the step 1052, the operation continues to the step 1010.

Figure 11A:
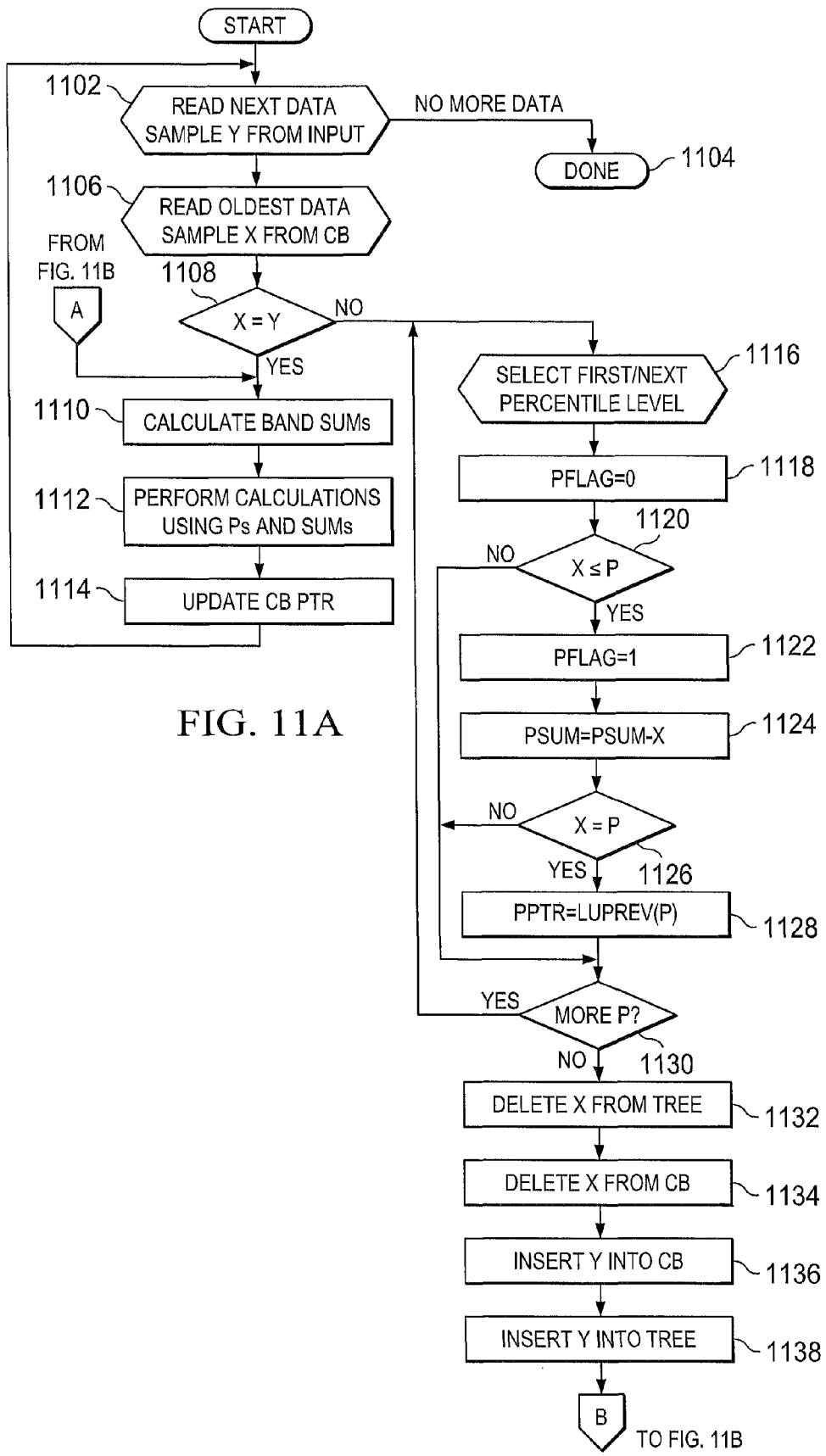
FIG. 11A is a flowchart of a first part of a second operation of the measuring device of the system of FIG. 1.
Figure 11B:
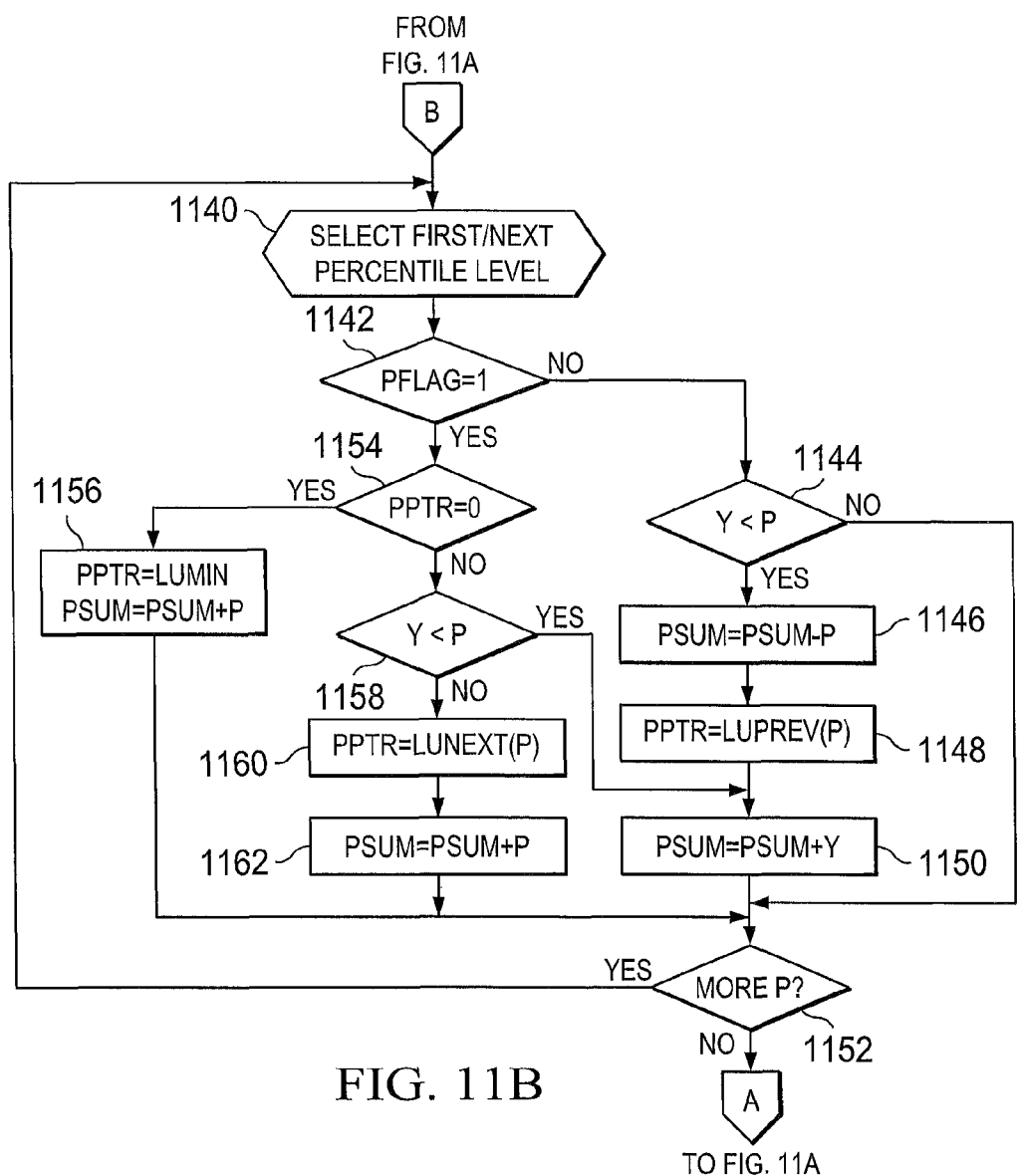
FIG. 11B is a flowchart of a second part of the second operation of the measuring device of the system of FIG. 1.

FIGS. 11A and 11B (collectively "FIG. 11") are flowcharts of a second operation of the measuring device 102, in which the measuring device 102 determines a band sum between two percentile levels. FIG. 11A represents the steps for deleting the oldest data value from the circular buffer ("deleting steps"). FIG. 11B represents the steps for inserting the newest data value into the circular buffer ("inserting steps"), and for determining the band sum. In an alternative embodiment, the measuring device 102 performs the inserting steps of FIG. 11B before performing the deleting steps of FIG. 11A.

Initially, starting at the first TE value ($x_1$) from among the total number N of TE values, the performance monitoring device 214 stores the first n values (n data samples) in the circular buffer ("CB"). The operation begins at a step 1102, at which the device 214 reads (from among the total number N of TE values) the then-current next data sample ("Y") that the device 214 has not already stored in the CB. If the device 214 has already read (and stored in the CB) all N of the TE values before the step 1102, then the operation continues from the step 1102 to a step 1104, at which the operation ends.

Conversely, if the device 214 has not already read (and stored in the CB) all N of the TE values before the step 1102, then the operation continues from the step 1102 to a step 1106, at which the device 214 reads the then-current oldest data sample ("X") from the CB. After the step 1106, the operation continues to a step 1108, at which the device 214 determines whether X=Y (i.e., whether the value of X equals the value of Y).

If X=Y, then the then-current values of the band sums ("BSUMs"), the then-current values of the percentile sums ("PSUMs"), and the then-current values at the PPTR positions within the CB ("Ps") will remain unchanged, and the operation continues from the step 1108 to a step 1110, at which the device 214 calculates the BSUMs. After the step 1110, the operation continues to a step 1112, at which the device 214 performs its sliding window statistics calculations in response to the BSUMs, PSUMs and/or Ps. After the step 1112, the operation continues to a step 1114, at which the device 214 updates the CBPTR as discussed further hereinabove in connection with FIGS. 4A through 9E. After the step 1114, the operation returns to the step 1102.

In the example of FIGS. 4A through 9E, which are discussed further hereinabove: (a) the PSUMs include the 33 Pctile PSUM and the 67 Pctile PSUM; (b) the BSUMs include the BSUM that the device 214 computes by subtracting the 33 Pctile PSUM from the 67 Pctile PSUM, and by then adding the $33^{rd}$ percentile value; and (c) the Ps include the $33^{rd}$ percentile value (at the 33 Pctile PPTR position within the CB) and the $67^{th}$ percentile value (at the 67 Pctile PPTR position within the CB). Moreover, the device 214 is suitable for operating in response to other percentiles and/or percentile ranges that are specified by the human user 218 via the user interface device 216.

Referring again to the step 1108, if X≠Y, then the operation continues from the step 1108 to a step 1116, at which the device 214 selects a next user-specified percentile level. After the step 1116, the operation continues to a step 1118, at which the device 214 clears such percentile's respective PFLAG to 0. After the step 1118, the operation continues to a step 1120, at which the device 214 determines whether X≤P (i.e., whether the value of X is less than or equal to the value of P) for such percentile. If X≤P for such percentile, then such percentile's respective PSUM and P will change by deletion of X from the CB, and the operation continues from the step 1120 to a step 1122, at which the device 214 sets such percentile's respective PFLAG to 1. After the step 1122, the operation continues to a step 1124, at which the device 214 reduces such percentile's respective PSUM by the value of X.

After the step 1124, the operation continues to a step 1126, at which the device 214 determines whether X=P (i.e., whether the value of X was stored as the value of P) for such percentile. If X=P for such percentile, then the operation continues from the step 1126 to a step 1128, at which the device 214 changes such percentile's respective PPTR position to be the position of a next lowest value within the CB. At the start of the step 1128 operation, if such percentile's respective PPTR position is already the position of a lowest value within the CB, then such percentile's respective PPTR=0 at the end of the step 1128 operation. After the step 1128, the operation continues to a step 1130.

Referring again to the step 1126, if X≠P for such percentile, then the operation continues from the step 1126 to the step 1130.

Referring again to the step 1120, if X>P for such percentile, then such percentile's respective PSUM and P will remain unchanged by deletion of X from the CB, and the operation continues from the step 1120 to the step 1130, at which the device 214 determines whether a next user-specified percentile level remains to be processed in the steps 1116 through 1128. If a next user-specified percentile level remains to be processed in the steps 1116 through 1128, then the operation returns to the step 1116.

Conversely, if all user-specified percentile levels have been processed in the steps 1116 through 1128, then the operation continues from the step 1130 to a step 1132, at which the device 214 deletes X from the red-black tree data structure and rearranges nodes thereof to comply with conventional rules for a red-black tree data structure. After the step 1132, the operation continues to a step 1134, at which the device 214 deletes X from the CB. After the step 1134, the operation continues to a step 1136, at which the device 214 inserts Y into the CB. After the step 1136, the operation continues to a step 1138, at which the device 214 inserts Y into the red-black tree data structure and rearranges nodes thereof to comply with conventional rules for a red-black tree data structure.

After the step 1138, the operation continues to a step 1140, at which the device 214 selects a next user-specified percentile level. After the step 1140, the operation continues to a step 1142, at which the device 214 determines whether such percentile's respective PFLAG=1. If such percentile's respective PFLAG≠1, then the operation continues from the step 1142 to a step 1144, at which the device 214 determines whether Y<P (i.e., whether the value of Y is less than the value of P) for such percentile.

If Y<P, then such percentile's respective PSUM and P will change by insertion of Y into the CB, and the operation continues from the step 1144 to a step 1146, at which the device 214 reduces such percentile's respective PSUM by the value of such percentile's respective P. After the step 1146, the operation continues to a step 1148, at which the device 214 changes such percentile's respective PPTR position to be the position of a next lowest value within the CB. After the step 1148, the operation continues to a step 1150, at which the device 214 increases such percentile's respective PSUM by the value of Y.

After the step 1150, the operation continues to a step 1152, at which the device 214 determines whether a next user-specified percentile level remains to be processed in the steps 1140 through 1162. If a next user-specified percentile level remains to be processed in the steps 1140 through 1162, then the operation returns to the step 1140. Conversely, if all user-specified percentile levels have been processed in the steps 1140 through 1162, then the operation continues from the step 1152 to the step 1110.

For example, if the user-specified percentile levels are 10, 20 and 80, then the device 214 computes:

(a) for the $10^{th}$ percentile: a $10^{th}$ percentile PSUM, a $10^{th}$ percentile value (i.e., the largest TE value from among the lowest 10% of TE values within the circular buffer), and a $10^{th}$ percentile PPTR (i.e., the position of the $10^{th}$ percentile value within the circular buffer);

(b) for the $20^{th}$ percentile: a $20^{th}$ percentile PSUM, a $20^{th}$ percentile value (i.e., the largest TE value from among the lowest 20% of TE values within the circular buffer), and a $20^{th}$ percentile PPTR (i.e., the position of the $20^{th}$ percentile value within the circular buffer); and (c) for the $80^{th}$ percentile: an $80^{th}$ percentile PSUM, an $80^{th}$ percentile value (i.e., the largest TE value from among the lowest 80% of TE values within the circular buffer), and an $80^{th}$ percentile PPTR (i.e., the position of the $80^{th}$ percentile value within the circular buffer).

In such example, at the step 1110, the device 214 is able to calculate the following percentile bands' respective BSUMs, which are selectable by the human user 218 via the user interface device 216:

(a) 0%-10% BSUM, which is equal to the $10^{th}$ percentile PSUM;

(b) 0%-20% BSUM, which is equal to the $20^{th}$ percentile PSUM;

(c) 0%-80% BSUM, which is equal to the $80^{th}$ percentile PSUM;

(d) 10%-20% BSUM, which is equal to the $20^{th}$ percentile PSUM, minus the $10^{th}$ percentile PSUM, plus the $10^{th}$ percentile value;

(e) 10%-80% BSUM, which is equal to the $80^{th}$ percentile PSUM, minus the $10^{th}$ percentile PSUM, plus the $10^{th}$ percentile value; and (f) 20%-80% BSUM, which is equal to the $80^{th}$ percentile PSUM, minus the $20^{th}$ percentile PSUM, plus the $20^{th}$ percentile value.

With reference to the bandTDEV($\tau$) equation hereinabove: (a) a percentile band's respective BSUM(i), divided by such percentile band's respective m, equals such percentile band's respective $x'_{bend\_mean}(i)$; and (b) the device 214 computes such percentile band's respective bandTDEV($\tau$) in response to such percentile band's respective $x'_{bend\_mean}(i)$, $x'_{bend\_mean}(i+n)$ and $x'_{bend\_mean}(i+2n)$. Accordingly, the device 214 computes such percentile band's respective bandTDEV(r) in response to such percentile band's respective BSUM(i), BSUM(i+n) and BSUM(i+2n). For that reason, as the device 214 slides the $\tau$ window and computes such percentile band's respective BSUM(i+2n) in the illustrative embodiment, the device 214: (a) then-currently stores its then-most recently computed 2n+1 of such percentile band's respective BSUMs, namely such percentile band's respective BSUM(i) through BSUM(i+2n); and (b) computes such percentile band's respective bandTDEV($\tau$) in response to such percentile band's respective BSUM(i), BSUM(i+n) and BSUM(i+2n), without recomputing such BSUM(i) and BSUM(i+n).

Referring again to the step 1144, if Y≥P for such percentile, then such percentile's respective PSUM and P will remain unchanged by insertion of Y into the CB, and the operation continues from the step 1144 to the step 1152.

Referring again to the step 1142, if such percentile's respective PFLAG=1, then the operation continues from the step 1142 to a step 1154, at which the device 214 determines whether such percentile's respective PPTR=0. If such percentile's respective PPTR=0, then the operation continues to a step 1156, at which the device 214: (a) changes such percentile's respective PPTR position to the position of a lowest value within the CB; and (b) increases such percentile's respective PSUM by the value of such percentile's respective P. After the step 1156, the operation continues to the step 1152.

Referring again to the step 1154, if such percentile's respective PPTR≠0, then the operation continues from the step 1154 to a step 1158, at which the device 214 determines whether Y<P (i.e., whether the value of Y is less than the value of P) for such percentile. If Y<P for such percentile, then the operation continues from the step 1158 to the step 1150. Conversely, if P for such percentile, then the operation continues from the step 1158 to a step 1160, at which the device 214 changes such percentile's respective PPTR position to be the position of a next highest value within the CB. After the step 1160, the operation continues to a step 1162, at which the device 214 increases such percentile's respective PSUM by the value of such percentile's respective P. After the step 1162, the operation continues to the step 1152.

The device 102 (including the device 214) and the slave timing device 110 (including the servo logic 120) operate in association with the human user 218. For example: (a) the user interface device 216 includes input devices, such as a conventional electronic keyboard (or keypad), a pointing device (e.g., conventional electronic "mouse," rollerball or light pen), and touch-sensitive circuitry of a liquid crystal display ("LCD") device; and (b) the user 218 operates such input devices to output alphanumeric text information to the device 214, which receives such alphanumeric text information.

The device 102 and the slave timing device 110 operate as information handling systems that include at least one respective computing device (e.g., digital signal processor or microprocessor) for executing and otherwise processing instructions, and for performing additional operations (e.g., communicating information) in response thereto. Each such device is formed by various electronic circuitry components for performing such device's operations. Also, the network 108 and the other system 100 devices are formed by various electronic circuitry components for performing their respective operations.

Such electronic circuitry components include computer-readable media (or apparatus) for storing information (e.g., instructions of software executed by the device 102 and the slave timing device 110, and data processed by the device 102 and the slave timing device 110 in response to such instructions), such as a hard disk drive, a removable flash memory card, and/or other memory device (e.g., random access memory ("RAM") device and/or read only memory ("ROM") device) or nonvolatile storage device.

For example, the slave timing device 110 and its computer-readable media are structurally and functionally interrelated with one another, as described further hereinbelow. In that regard, the computer-readable media of the slave timing device 110 are representative of the computer-readable media of the other system 100 devices. The computer-readable media store (or encode, or record, or embody) functional descriptive material (including, but not limited to, software and data structures). Such functional descriptive material imparts functionality when encoded on the computer-readable media. Also, such functional descriptive material is structurally and functionally interrelated to the computer-readable media.

Within such functional descriptive material, data structures define structural and functional interrelationships between such data structures and the computer-readable media (and other aspects of the slave timing device 110 and the system 100). Such interrelationships permit the data structures' functionality to be realized. Also, within such functional descriptive material, software (also referred to as computer programs or applications) defines structural and functional interrelationships between such software and the computer-readable media (and other aspects of the slave timing device 110 and the system 100). Such interrelationships permit the software's functionality to be realized.

For example, the slave timing device 110 reads (or accesses, or copies) such functional descriptive material from the computer-readable media into a memory device of the slave timing device 110, and the slave timing device 110 performs its operations (as described elsewhere herein) in response to such material, which is stored in the memory device of the slave timing device 110. More particularly, the slave timing device 110 performs the operation of processing software (which is stored, encoded, recorded or embodied on a computer-readable medium) for causing the slave timing device 110 to perform additional operations (as described elsewhere herein). Accordingly, the computer-readable media are apparatus from which the software is accessible by the slave timing device 110, and the software is processable by the slave timing device 110 for causing the slave timing device 110 to perform such additional operations. Further, such functional descriptive material exhibits a functional interrelationship with the way in which the slave timing device 110 executes its processes and performs its operations.

Although illustrative embodiments have been shown and described, a wide range of modification, change and substitution is contemplated in the foregoing disclosure and, in some instances, some features of the embodiments may be employed without a corresponding use of other features.

What is claimed is:

1. A system for measuring communications from a first device to a second device, comprising:
a measuring device for: in response to the communications, estimating respective phase differences between a first clock of the first device and a second clock of the second device; computing a first average phase difference within a percentile of a first subset of the respective phase differences, wherein the percentile is less than 100; and computing a second average phase difference within the percentile of a second subset of the respective phase differences, wherein the second subset is a modification of the first subset, and wherein the second average phase difference is computed in response to the first average phase difference and the modification.

2. The system of claim 1, wherein the modification includes deleting an oldest respective phase difference and inserting a next respective phase difference.

3. The system of claim 1, wherein the measuring device is for computing the second average phase difference by at least one of the following: subtracting from the first average phase difference in response to the modification; and adding to the first average phase difference in response to the modification.

4. The system of claim 1, wherein the measuring device is for storing the second subset of the respective phase differences, according to their respective percentiles, in a tree data structure; wherein the second average phase difference is computed in response to the first average phase difference and at least one of the following: a next highest respective phase difference identified by traversing the tree data structure in response to the modification; and a next lowest respective phase difference identified by traversing the tree data structure in response to the modification.

5. The system of claim 4, wherein the tree data structure is at least partially balanced.

6. The system of claim 4, wherein the tree data structure is a red-black tree data structure.

7. The system of claim 1, wherein the measuring device is for: in response to the communications, estimating respective delays between times when the first device outputs the communications and times when the second device receives the communications; and, in response to the respective delays, computing the respective phase differences.

8. The system of claim 1, wherein the measuring device is for: in response to the first average phase difference and the second average phase difference, computing a time deviation for measuring a quality of synchronization between the first and second devices.

9. The system of claim 1, wherein the communications are packets associated with respective timestamps.

10. The system of claim 1, wherein the percentile is a percentile range between a first percentile and a second percentile, wherein the first percentile is greater than 0, and wherein the second percentile is less than 100.

11. A method performed by an information handling system for measuring communications from a first device to a second device, the method comprising:
in response to the communications, estimating respective phase differences between a first clock of the first device and a second clock of the second device;
computing a first average phase difference within a percentile of a first subset of the respective phase differences, wherein the percentile is less than 100; and
computing a second average phase difference within the percentile of a second subset of the respective phase differences, wherein the second subset is a modification of the first subset, and wherein the second average phase difference is computed in response to the first average phase difference and the modification.

12. The method of claim 11, wherein the modification includes deleting an oldest respective phase difference and inserting a next respective phase difference.

13. The method of claim 11, wherein computing the second average phase difference comprises at least one of the following:
subtracting from the first average phase difference in response to the modification; and
adding to the first average phase difference in response to the modification.

14. The method of claim 11, and comprising:
storing the second subset of the respective phase differences, according to their respective percentiles, in a tree data structure;
wherein the second average phase difference is computed in response to the first average phase difference and at least one of the following: a next highest respective phase difference identified by traversing the tree data structure in response to the modification; and a next lowest respective phase difference identified by traversing the tree data structure in response to the modification.

15. The method of claim 14, wherein the tree data structure is at least partially balanced.

16. The method of claim 14, wherein the tree data structure is a red-black tree data structure.

17. The method of claim 11, wherein the estimating comprises:
in response to the communications, estimating respective delays between times when the first device outputs the communications and times when the second device receives the communications; and in response to the respective delays, computing the respective phase differences.

18. The method of claim 11, and comprising:

in response to the first average phase difference and the second average phase difference, computing a time deviation for measuring a quality of synchronization between the first and second devices.

19. The method of claim 11, wherein the communications are packets associated with respective timestamps.

20. The method of claim 11, wherein the percentile is a percentile range between a first percentile and a second percentile, wherein the first percentile is greater than 0, and wherein the second percentile is less than 100.

21. A computer program product for measuring communications from a first device to a second device, the computer program product comprising:

a non-transitory computer-readable storage medium having a computer-readable program embodied therewith, the computer-readable program comprising:

computer-readable instructions processable by an information handling system for causing the information handling system to: in response to the communications, estimate respective phase differences between a first clock of the first device and a second clock of the second device; compute a first average phase difference within a percentile of a first subset of the respective phase differences, wherein the percentile is less than 100; and compute a second average phase difference within the percentile of a second subset of the respective phase differences, wherein the second subset is a modification of the first subset, and wherein the second average phase difference is computed in response to the first average phase difference and the modification.

22. The computer program product of claim 21, wherein the modification includes deleting an oldest respective phase difference and inserting a next respective phase difference.

23. The computer program product of claim 21, wherein the computer-readable instructions are processable by the information handling system for causing the information handling system to compute the second average phase difference by at least one of the following: subtracting from the first average phase difference in response to the modification; and adding to the first average phase difference in response to the modification.

24. The computer program product of claim 21, wherein the computer-readable instructions are processable by the information handling system for causing the information handling system to store the second subset of the respective phase differences, according to their respective percentiles, in a tree data structure; wherein the second average phase difference is computed in response to the first average phase difference and at least one of the following: a next highest respective phase difference identified by traversing the tree data structure in response to the modification; and a next lowest respective phase difference identified by traversing the tree data structure in response to the modification.

25. The computer program product of claim 24, wherein the tree data structure is at least partially balanced.

26. The computer program product of claim 24, wherein the tree data structure is a red-black tree data structure.

27. The computer program product of claim 21, wherein the computer-readable instructions are processable by the information handling system for causing the information handling system to: in response to the communications, estimate respective delays between times when the first device outputs the communications and times when the second device receives the communications; and, in response to the respective delays, compute the respective phase differences.

28. The computer program product of claim 21, wherein the computer-readable instructions are processable by the information handling system for causing the information handling system to: in response to the first average phase difference and the second average phase difference, compute a time deviation for measuring a quality of synchronization between the first and second devices.

29. The computer program product of claim 21, wherein the communications are packets associated with respective timestamps.

30. The computer program product of claim 21, wherein the percentile is a percentile range between a first percentile and a second percentile, wherein the first percentile is greater than 0, and wherein the second percentile is less than 100.

* * * * *